Jan. 26, 1971  J. B. JOHNSON, JR  3,558,258
MOBILE SPRINKLER CONTROL APPARATUSES
Filed Oct. 21, 1969  14 Sheets-Sheet 1
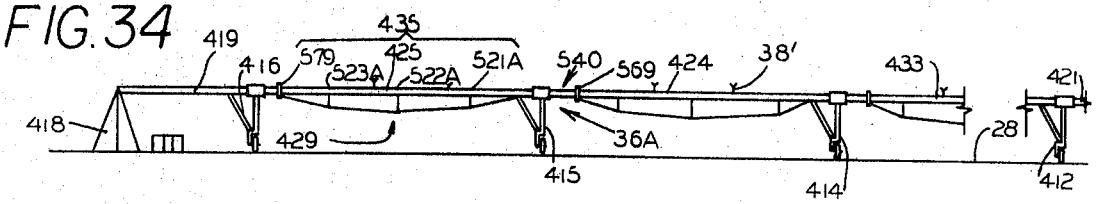
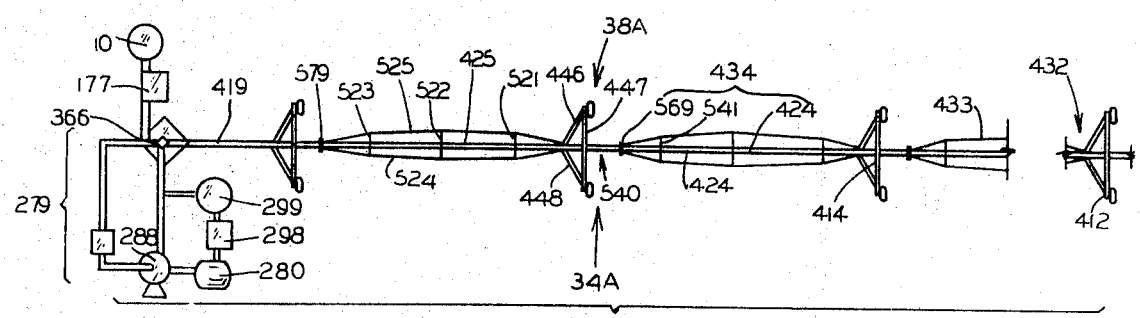
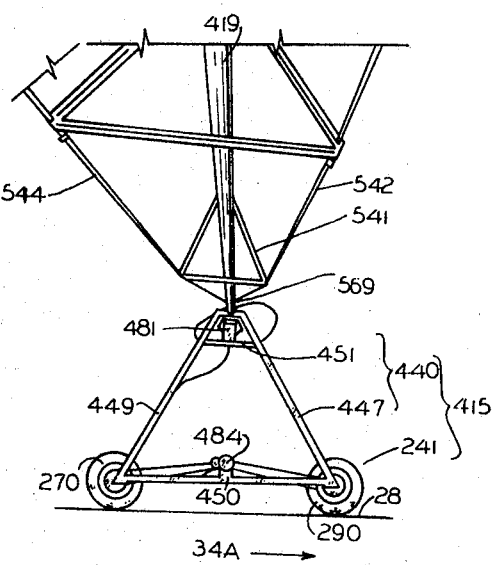
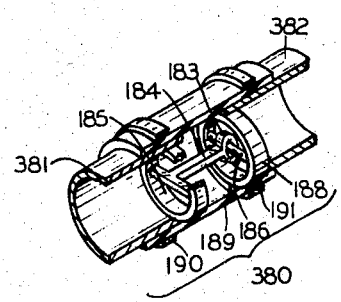
INVENTOR
JAMES B. JOHNSON JR.
BY:
Ely Silverman
ATTORNEY Jan. 26, 1971  J. B. JOHNSON, JR  3,558,258
MOBILE SPRINKLER CONTROL APPARATUSES
Filed Oct. 21, 1969  14 Sheets-Sheet 2
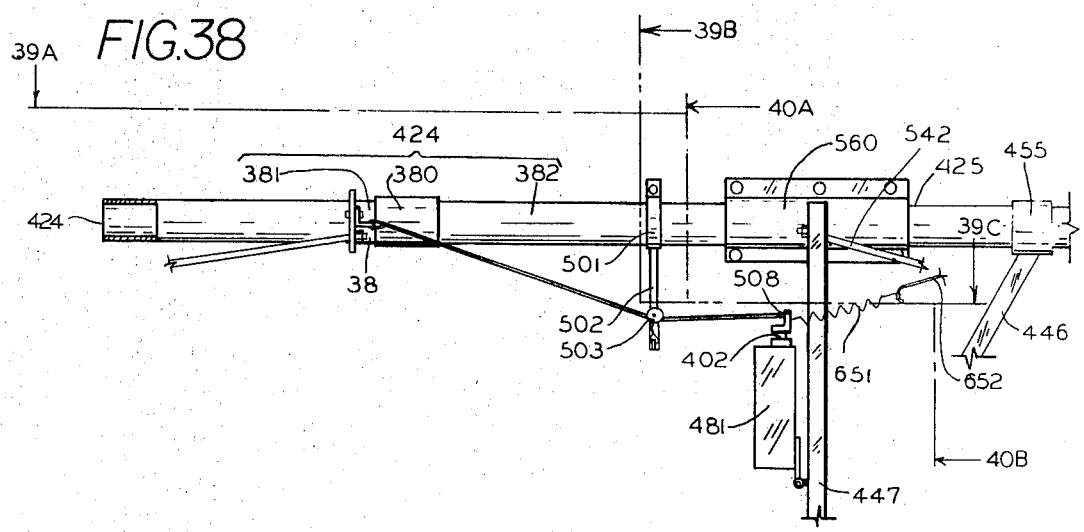
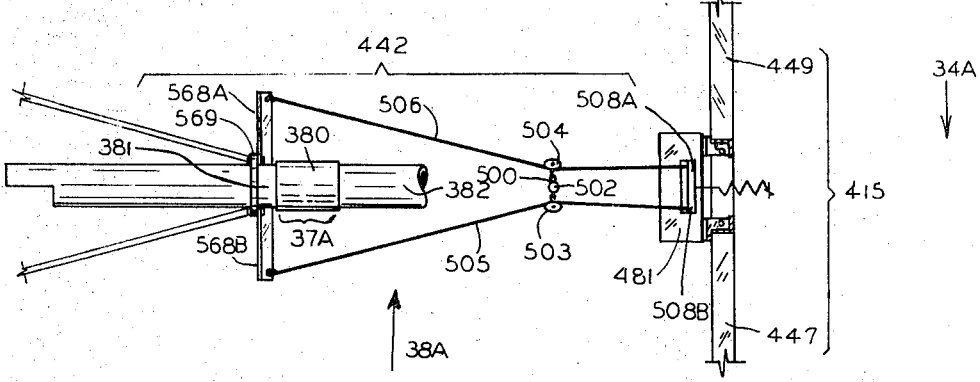
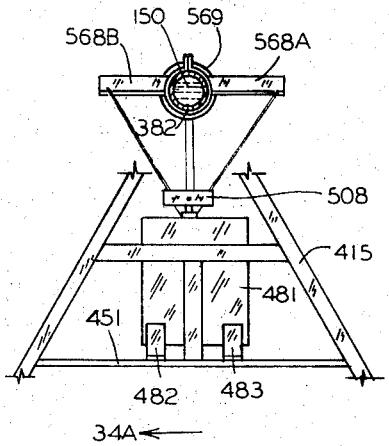
JAMES B. JOHNSON JR.
INVENTOR
BY
*Ely Silverman*
ATTORNEY

JAMES B. JOHNSON JR.
INVENTOR

BY

Ely Silverman
ATTORNEY

JAMES B. JOHNSON JR.
INVENTOR

BY

Ely Silberman
ATTORNEY

Jan. 26, 1971  J. B. JOHNSON, JR  3,558,258
MOBILE SPRINKLER CONTROL APPARATUSES
Filed Oct. 21, 1969  14 Sheets-Sheet 5

JAMES B. JOHNSON JR.
INVENTOR.

BY

*Ely Silverman*
ATTORNEY

JAMES B. JOHNSON JR.
INVENTOR

BY

Ely Silverman
ATTORNEY

JAMES B. JOHNSON JR.
INVENTOR

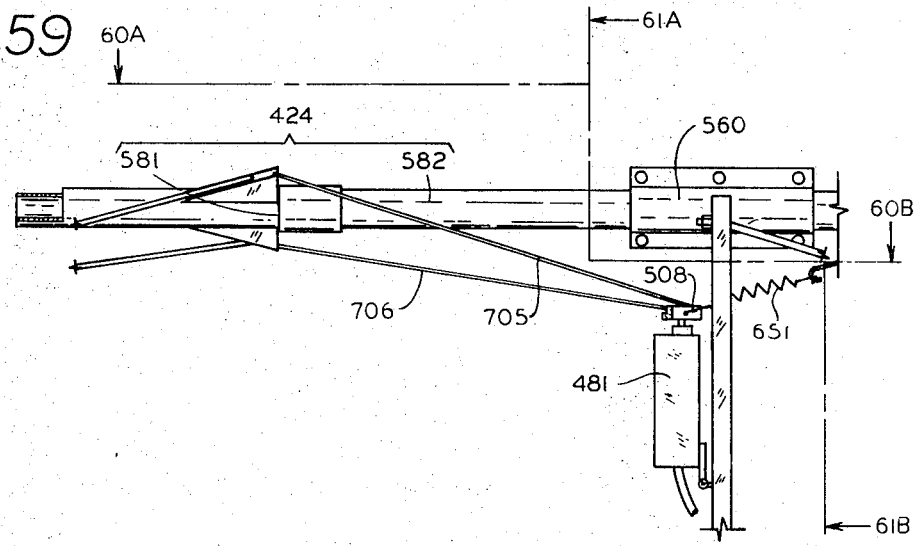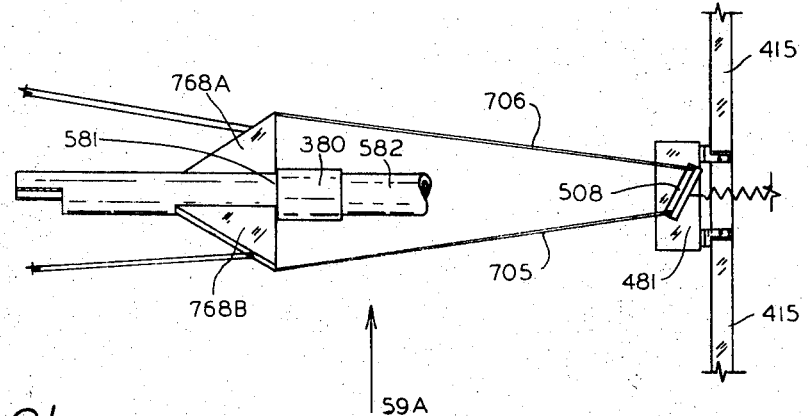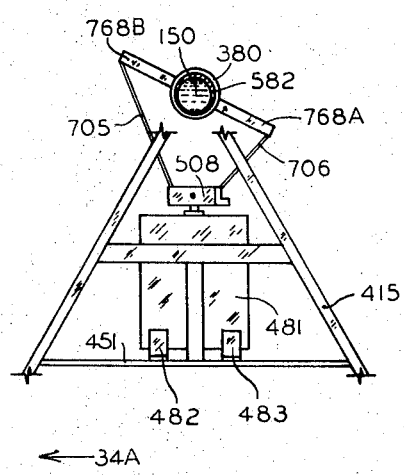

JAMES B. JOHNSON JR.
INVENTOR

BY

Ely Silverman
ATTORNEY

Jan. 26, 1971  J. B. JOHNSON, JR  3,558,258

MOBILE SPRINKLER CONTROL APPARATUSES

Filed Oct. 21, 1969  14 Sheets-Sheet 11

JAMES B. JOHNSON JR.
INVENTOR

BY

*Ely Silverman*
ATTORNEY

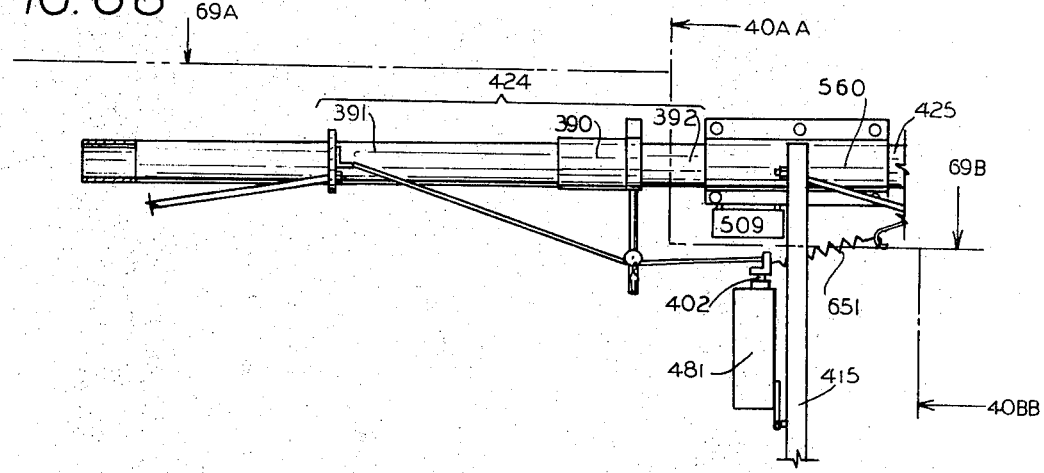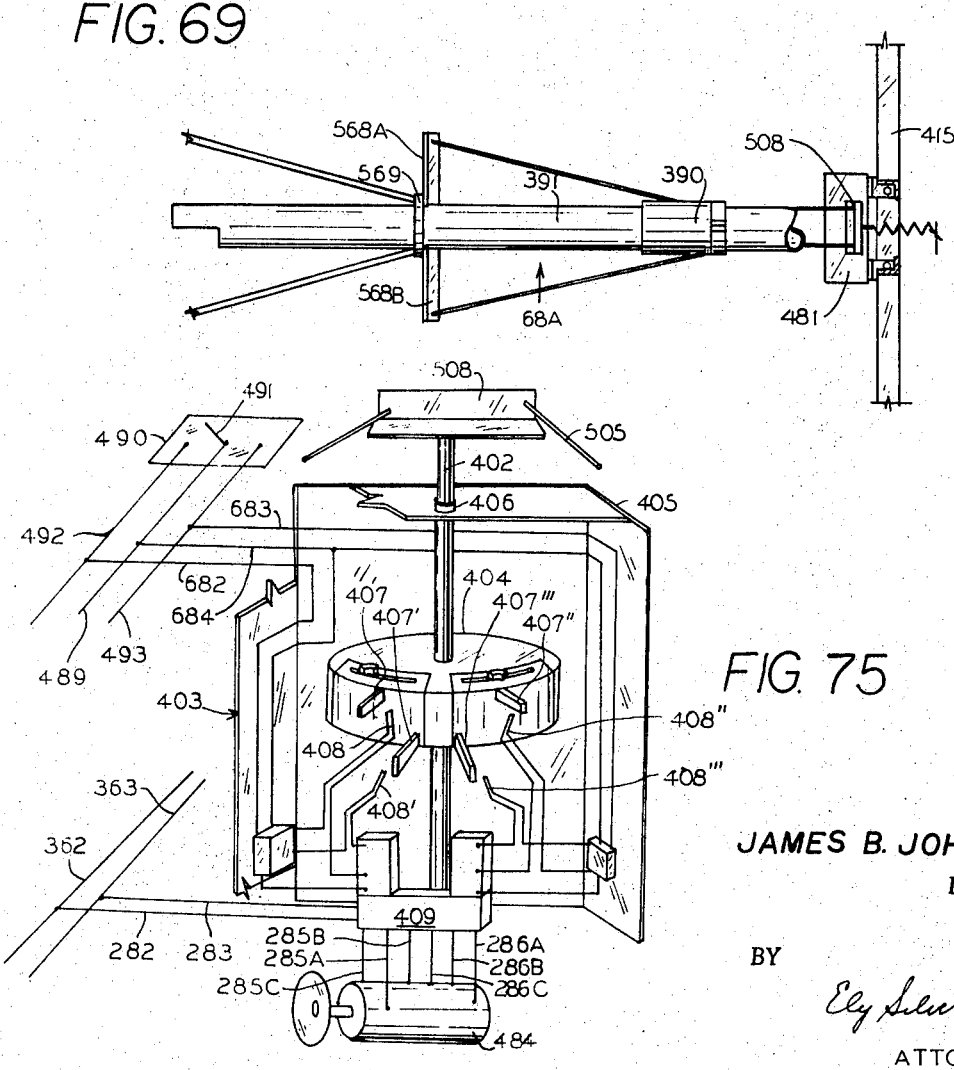

Jan. 26, 1971   J. B. JOHNSON, JR   3,558,258
MOBILE SPRINKLER CONTROL APPARATUSES
Filed Oct. 21, 1969    14 Sheets-Sheet 14
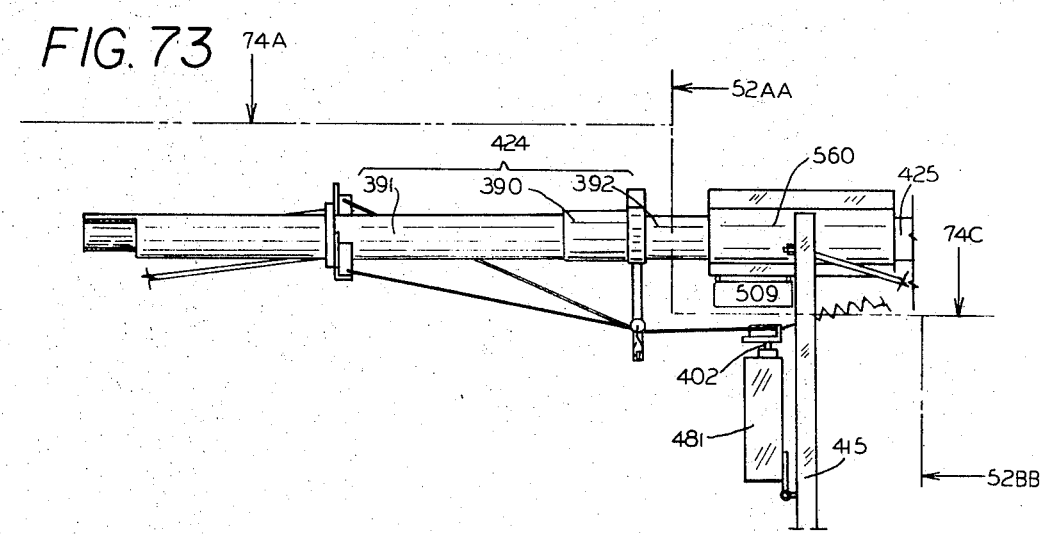
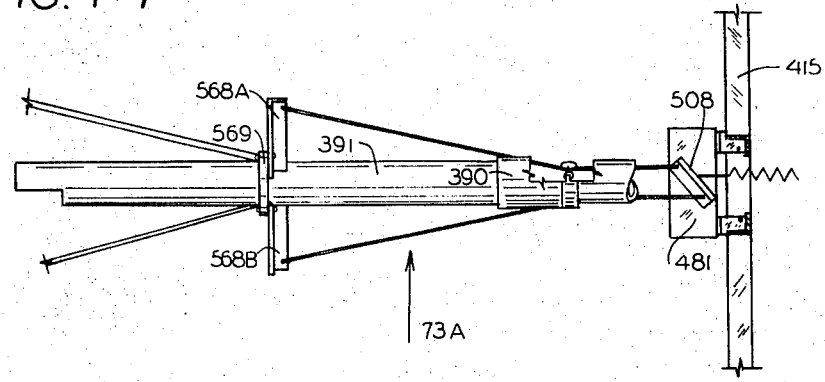
JAMES B. JOHNSON JR.
INVENTOR
BY
ATTORNEY United States Patent Office 3,558,258
Patented Jan. 26, 1971

3,558,258
MOBILE SPRINKLER CONTROL APPARATUSES
James Burl Johnson, Jr., Lubbock, Tex., assignor to Gifford-Hill-Western, a division of Gifford-Hill & Co., Inc., Dallas, Tex., a corporation of Delaware
This application is a continuation-in-part of Ser. No. 868,181, which is a continuation-in-part of Ser. No. 868,182, which is a continuation-in-part of Ser. No. 787,311, Jan. 3, 1969, now Patent No. 3,484,046. This application Oct. 21, 1969, Ser. No. 868,183
The portion of the term of the patent subsequent to Dec. 16, 1986, has been disclaimed
Int. Cl. B05b 3/00
U.S. Cl. 239—177                    8 Claims

ABSTRACT OF THE DISCLOSURE

Combination of irrigation sprinkler supporting pipe sections and movable pipe supporting towers rigidly united with motors on each tower station, each section of pipe pivotally connected to the next, an improved motor control for each tower connected to the section of pipe outboard thereof so as to be readily adjusted as well as responsive to the uphill and downhill as well as retarded and advanced position of that tower, and thereby distribute irrigation water in an even and predictable manner over undulating as well as flat ground.

CROSS-REFERENCE TO RELATED APPLICATIONS

. This is a continuation-in-part of application of Harold Jay Harris and James Burl Johnson, Jr., executed concurrently and filed concurrently herewith entitled "Improved Sprinkling Apparatus Control," Ser. No. 868,181 which patent application is a continuation-in-part of patent application Ser. No. 868,182 entitled "Improved Sprinkling Process and Apparatus Therefor" by Harold Jay Harris executed concurrently and filed concurrently, which patent application Ser. No. 868,182 is a continuation-in-part of patent application Ser. No. 787,311 filed Jan. 3, 1969, by Harold Jay Harris, entitled "Sprinkling Process and Apparatus Therefor" now U.S. Pat. 3,484,046 issued Dec. 16, 1969.

The above-mentioned three applications Ser. No. 868,-181, Ser. No. 868,182 and Ser. No. 787,311 are assigned to the assignee of this patent application.

BACKGROUND OF THE INVENTION (1) The field of the invention is that of a process of fluid spraying and sprinkling utilizing an apparatus comprising a series of joined lengths of fluid conduits having appropriate spray outlet means and vehicular support means secured thereto, the whole being such to conform to the contour of the terrain while in spraying position.

(2) Description of the prior art: Prior moving sprinkler apparatuses applied equal power for varied lengths of interrupted periods of time to effect control of motion of each of several pipe supporting stations at the limit of substantial allowed variation of relative back and forth position of those stations and provide no effective compensation for the varied power required to move a pipe supporting station supporting a long length of water filled pipe uphill and downhill while discharging a substantial volume of water upwardly from such pipe at substantial pressures. Sprinkling apparatus which depends upon movement of movable wheeled pipe supports controlled by substantial bending or springing of the pipe located between the support towers or stations require the development of substantial lags between pairs of such pipe supporting towers or stations prior to actuation of the lagging station and prior to stopping of the station in an advanced position. Also, failure to compensate for the uphill motion as well as lagging position thereof develops further lags in the uphill moving pipe supporting stations relative to like pipe supporting stations moving over level ground and results in a non-uniform distribution of the liquid sprinkled on undulating ground.

SUMMARY OF THE INVENTION

A guyed pipe structure very resistant to twist about the longitudinal axis of the pipe string, in combination with an outboard pivot joint and a smoothly operating motor control below the pipe string provides corrective action for twist of adjacent pipe supporting stations relative to each other and the algebraic summation of twist and bend of the Harris-Johnson application without interference with the water distribution pattern from the top of the pipe string.

The guying of the pipe between towers particularly concentrates any bending and twisting as well as any bending or twisting of the pipe between the station to a small portion of the pipe and provides an improved combination of means for detecting differences in angular orientation and transverse displacement of the pipe supporting stations relative to the intended longitudinal axis of the pipe string in the system and applying the effect of such detections to motor means for rapid corrective action as needed.

BRIEF DESCRIPTION OF THE DRAWINGS

FIGS. 34 and 35 are schematic exaggerated views of an embodiment of apparatus according to this invention. For convenience in the description only three stations, 414, 415 and 416 with motor units are shown to reduce the length of the figure, but a larger number as in Table I may be used.

FIG. 34 is a rear view of one embodiment of apparatus 411 showing representative portions thereof as seen along direction of arrow 34A of FIG. 35.

FIG. 35 is a top plan view taken of the apparatus 411 portions shown in FIG. 34.

FIG. 36 is an oblique and perspective view as seen from below and obliquely along the direction of arrow 36A of FIG. 35.

FIG. 37 is an enlarged, broken away oblique diagrammatic view of zone 37A of FIG. 38.

FIG. 38 is an enlarged front view of zone 38A of FIG. 34 showing the control assembly of a typical movable station, 415, of apparatus 411 as seen along the direction of arrow 38A of FIG. 35 with the stations 415 and 414 moving forward on flat horizontal ground and the central longitudinal axis of the pipe portions 381 and 382 co-axial. Arrows 34A and 38A are opposite.

FIGS. 38, 39 and 40 are respectively front, top and end views of the control assembly of one station 415 of apparatus 411 of FIGS. 34–36 diagrammatically; FIG. 38 being a front view, FIG. 39 being a top view along the composite section of planes 39A and 39B and 39C of FIG. 38, and FIG. 40 being a transverse sectional view along the composite section of vertical planes 40A and 40B of FIG. 38.

FIG. 42 is a composite section along planes 42A, 42B and 42C of FIG. 1 and FIG. 43 is a composite sectional view taken along vertical planes 43A and 43B of FIG. 41 and in the position of parts shown in FEG. 41.

The direction of motion of station 415 is shown by arrow 34A in FIGS. 35, 39, 40, 42, 43, 45, 46, 48, 49, 51 and 52.

Figure 44:
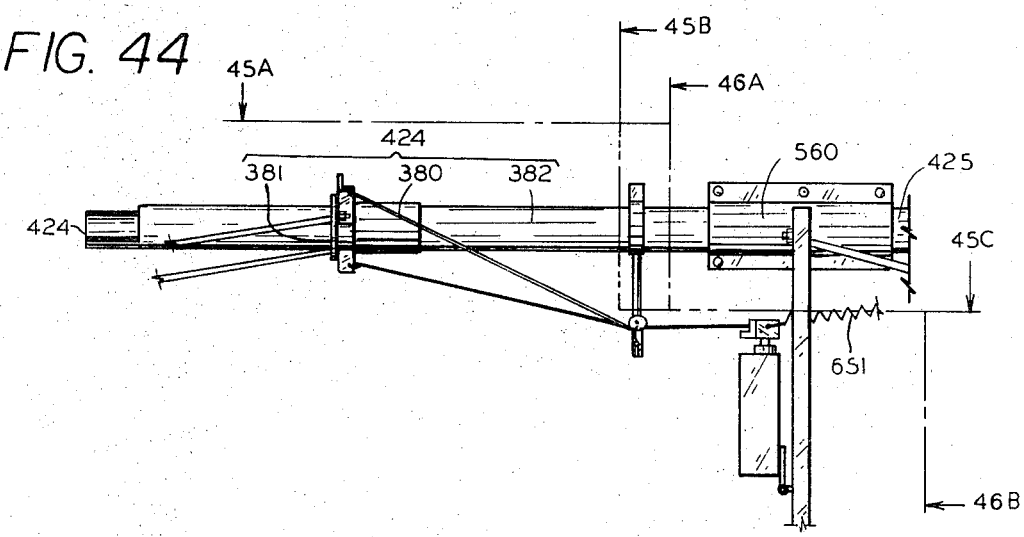
Figure 45:
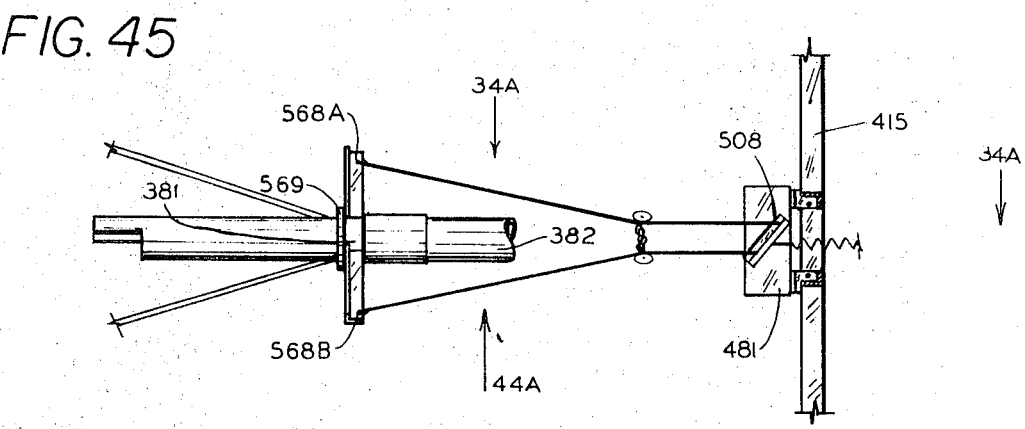
Figure 46:
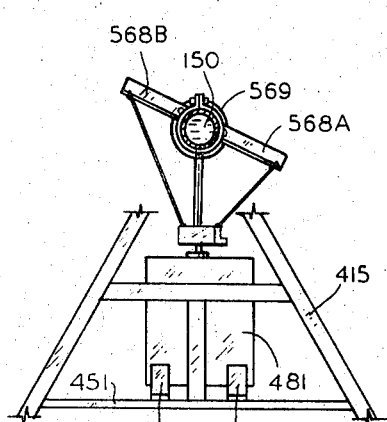

FIGS. 44, 45 and 46 are respectively, front, top and end views of control assembly of FIGS. 38–40 when the station 415 is going downhill relative to the horizontal pipe 424 and the station similarly attached thereto. The position of the cables shown in these figures provide for turning arm 508 of the switch 481 to its "off" position and so turn power off from motor on the station 415 on such downhill motion of the station 415. FIG. 44 is front view. FIG. 45 is a composite section along plane 45A, planes 45B and 45C of FIG. 44 and FIG. 46 is a composite sectional view taken along planes 46A and 46B of FIG. 44 and in position of parts shown in FIG. 44.

Figure 47:
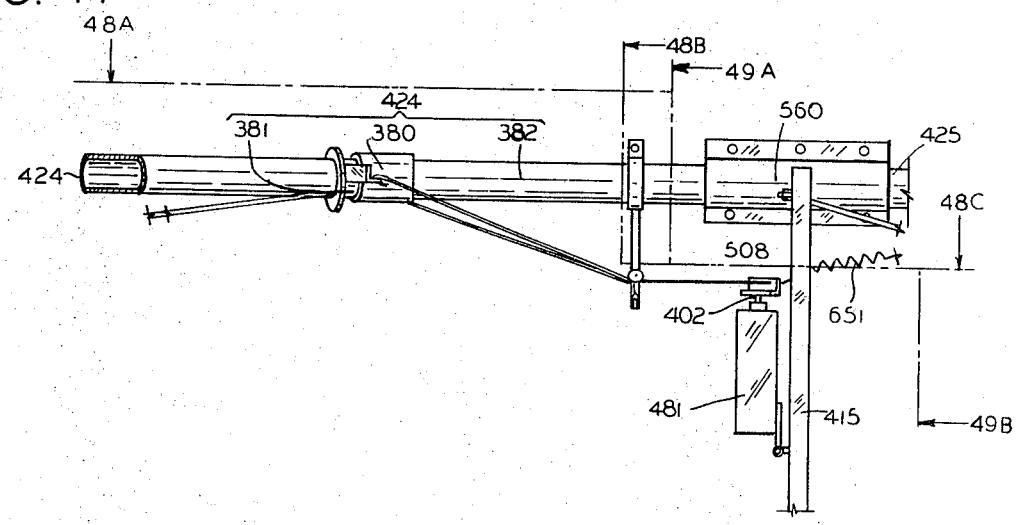
Figure 48:
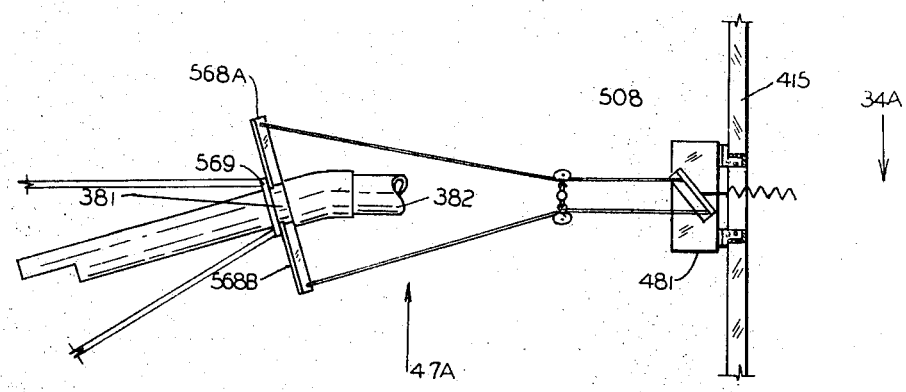
Figure 49:
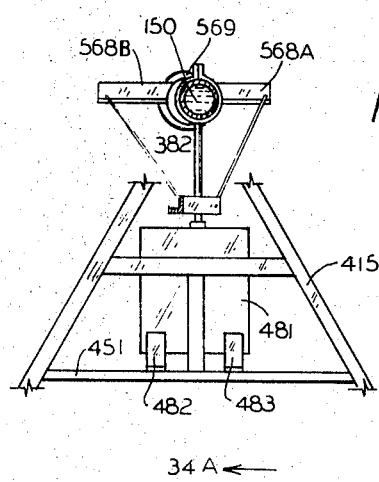

FIGS. 47, 48 and 49 are respectively, front, top and end views of the control assembly of FIGS. 38–40 when the station 415 of FIGS. 37–40 is in retard of the station radial thereto, i.e. the station attached to pipe 424. FIG. 48 is a composite section along planes 48A and 48B and 48C of FIG. 47 in the position of parts shown in FIG. 47. FIG. 49 is a composite sectional view along vertical planes 49A and 49B of FIG. 47 in position of parts shown in FIG. 47.

Figure 50:
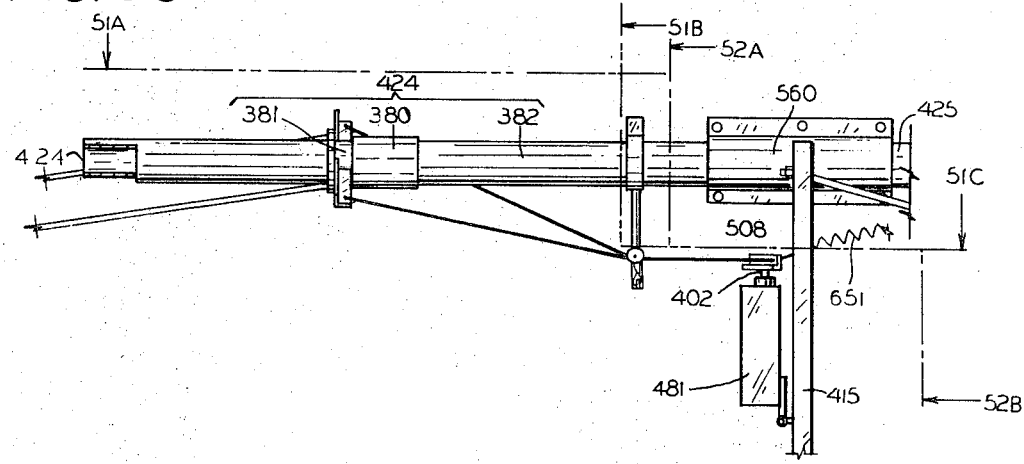
Figure 51:
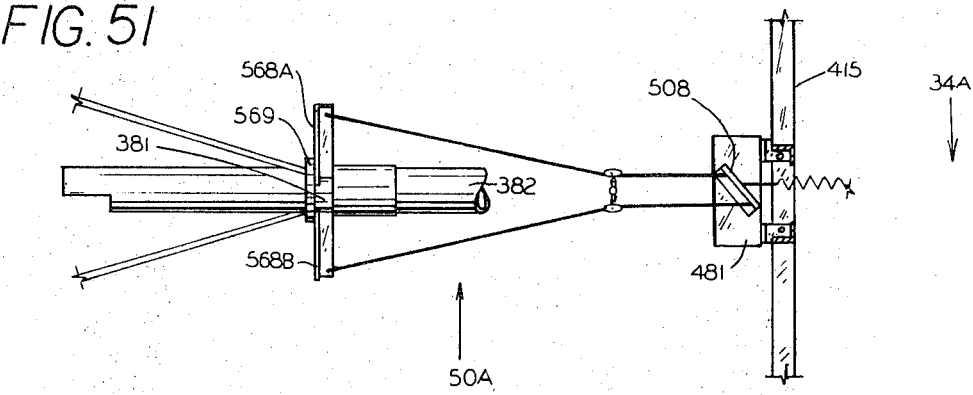
Figure 52:
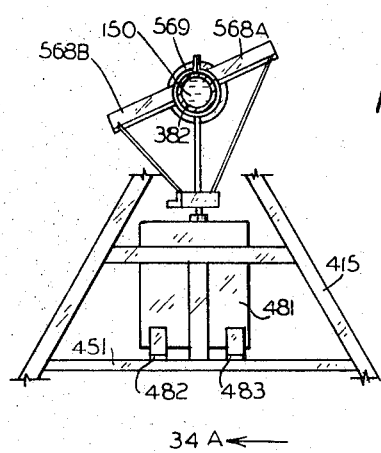

FIGS. 50, 51 and 52 are respectively, front, top and end views of the control assembly of FIGS. 38–40 where the station 415 is going uphill relative to its neighbor fixed to pipe 424 and the control cables here provide for the orientation of the arm 508 on the control assembly 442 to apply power to the motor of station 415. FIG. 51 is a front view and FIG. 50 is a composite section along planes 51A, 51B and 51C of FIG. 50 and FIG. 52 is a composite transverse sectional view taken along planes as 52A and 52B of FIG. 50 and in position of parts shown in FIG. 50.

Figure 53:
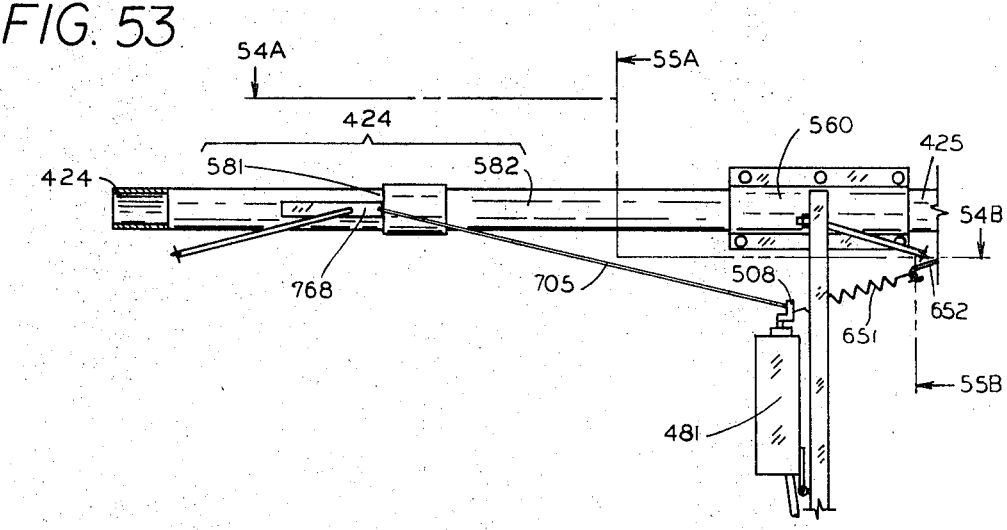

FIG. 53 is an enlarged front view of zone 38 of FIG. 34 showing a control assembly 642 for the station 415 of apparatus 411 as seen along the direction of arrow 38A of FIG. 39 and 53A of FIG. 54 with the stations 415 and 414 moving forward (as hereinabove defined) on flat horizontal ground and the central longitudinal axis of pipe portions 581 and 582 co-axial.

Figure 54:
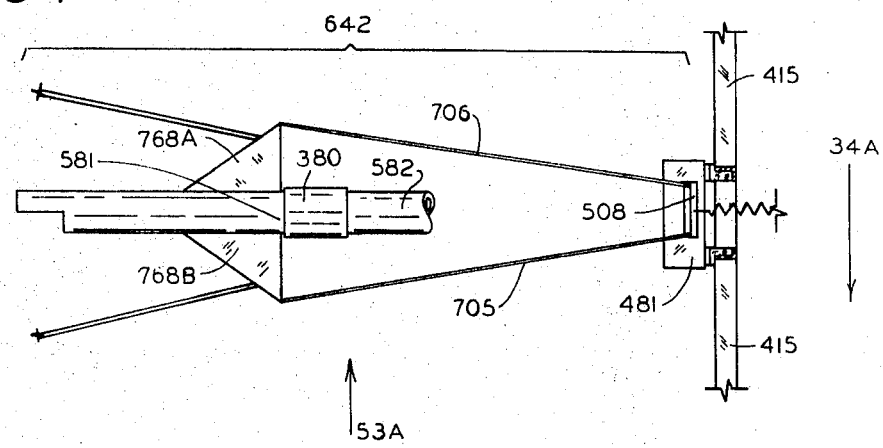
Figure 55:
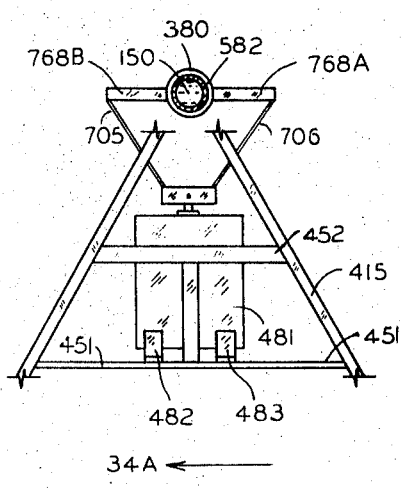

FIGS. 53, 54 and 55, are, respectively diagrammatic front top and end views of another control assembly 642 for station 415 of apparatus 411 of FIGS. 34–36, FIG. 53 being a front view, FIG. 54 being a top view along the composite section of planes 54A and 54B of FIG. 53 and FIG. 55 being a transverse sectional view along the composite section of vertical planes 55A and 55B of FIG. 53.

Figure 56:
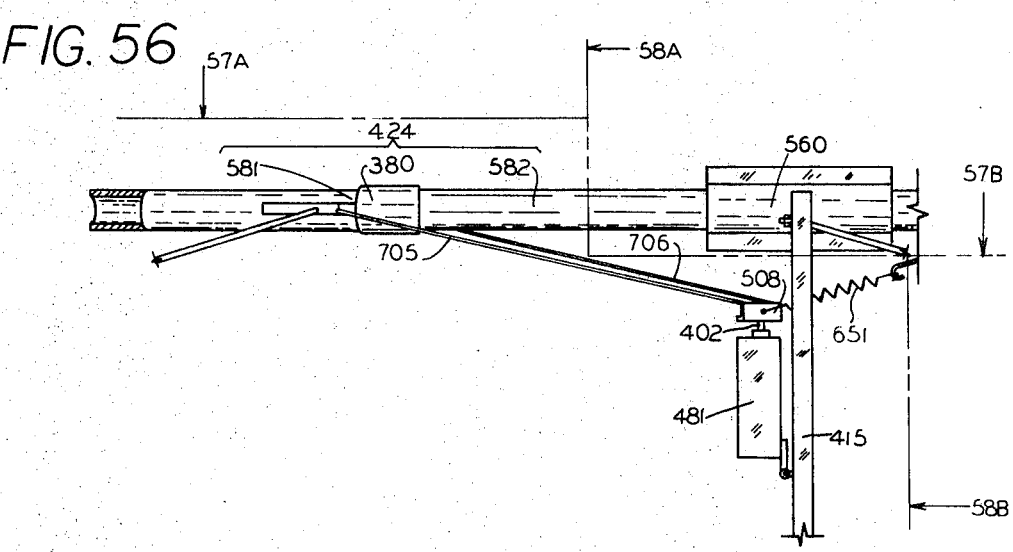
Figure 57:
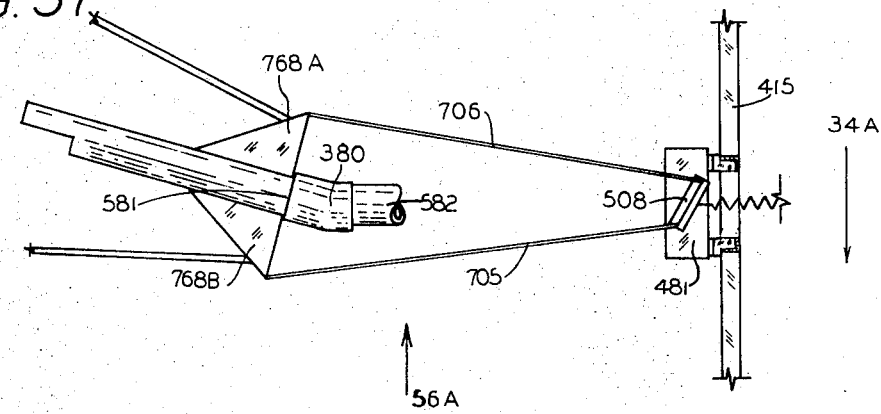
Figure 58:
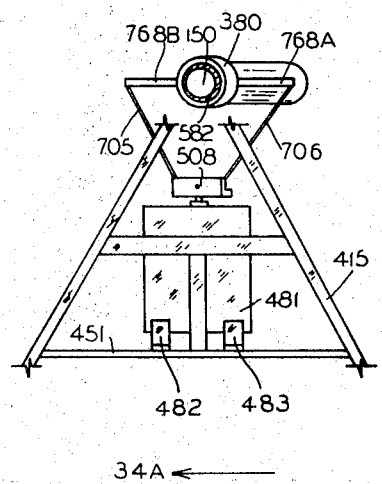

FIGS. 56, 57 and 58 are respectively, front top and end views of the control assembly 642 when the station of FIGS. 53–55 is in advance of the station radial thereto: FIG. 57 is a composite view along planes 57A and 57B of FIG. 56 in the position of parts shown in FIG. 56. FIG. 58 is a composite sectional view along the vertical planes 58A and 58B of FIG. 56 in the position of parts shown in FIG. 56.

FIGS. 59, 60, and 61 are respectively front, top and end views of the control assembly 642 of FIGS. 53–55 when the stations shown 415 is traveling downhill relative to its radially neighboring station fixed to the same pipe string; the position of the cables in these figures provide for orientation of the control arm 508 on the control assembly 642 to turn power off from the motor of the station shown (415).

FIG. 60 is a composite section along planes 60A and 60B of FIG. 59 in the position of parts shown in FIG. 59 and FIG. 61 is a composite transverse sectional view along the vertical planes 61A and 61B of FIG. 59 in the position of parts shown in FIG. 59.

Figure 62:
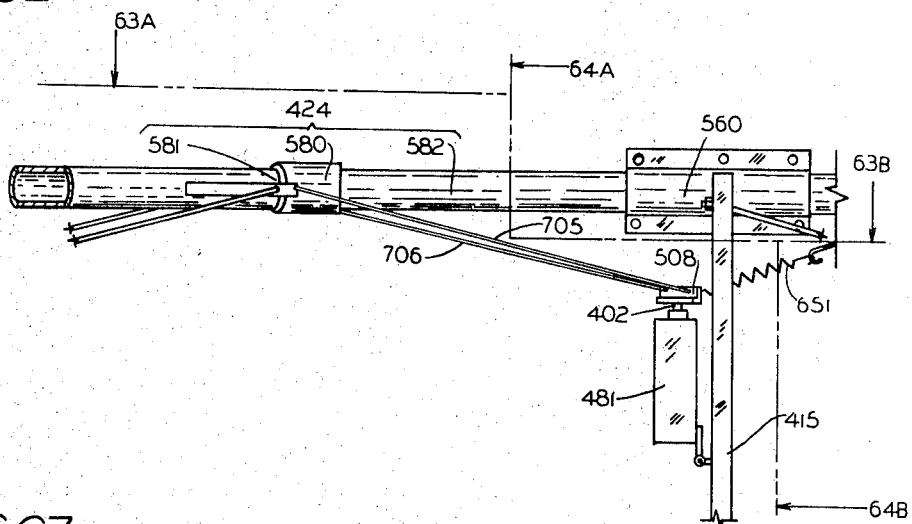
Figure 63:
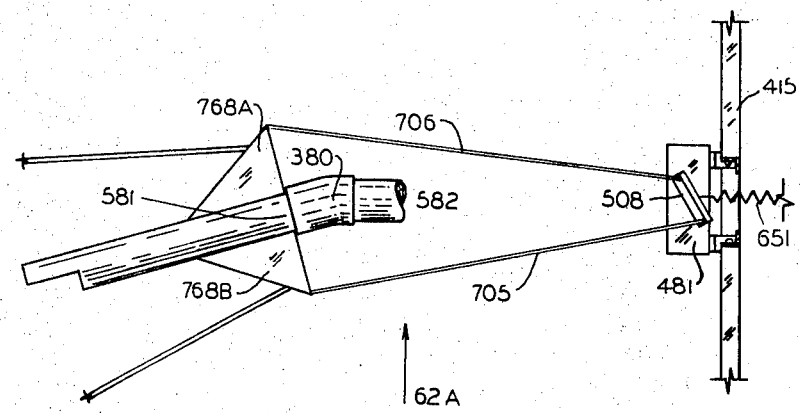
Figure 64:
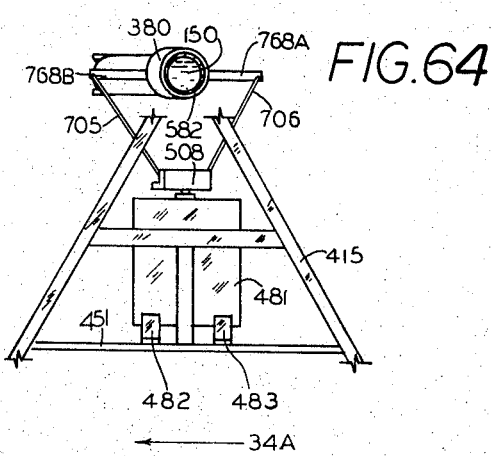

FIGS. 62, 63, and 64 are respectively, front top and end views of the control assembly 642 when the station of FIGS. 53–55 is in retard of the station radial thereto: FIG. 63 is a composite view along planes 63A and 63B of FIG. 62 in the position of parts shown in FIG. 56. FIG. 64 is a composite sectional view along the vertical planes 64A and 64B of FIG. 56 in the position of parts shown in FIG. 56.

Figure 65:
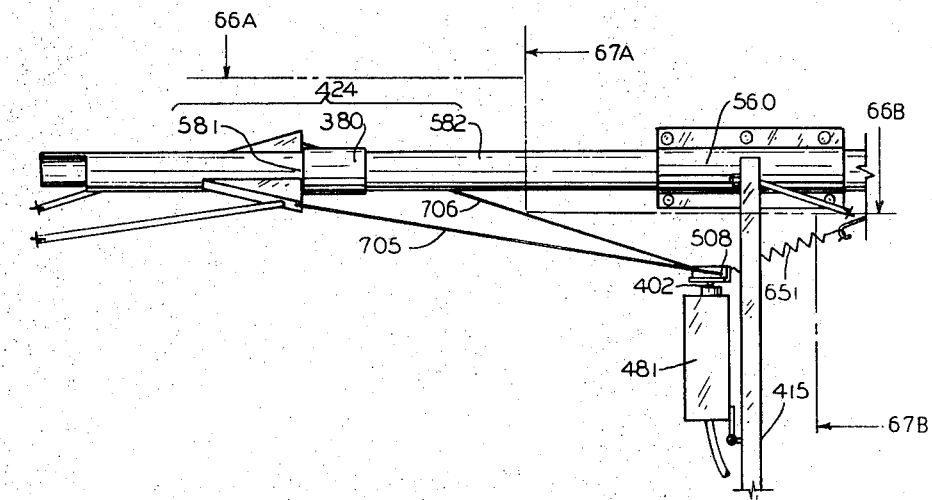
Figure 66:
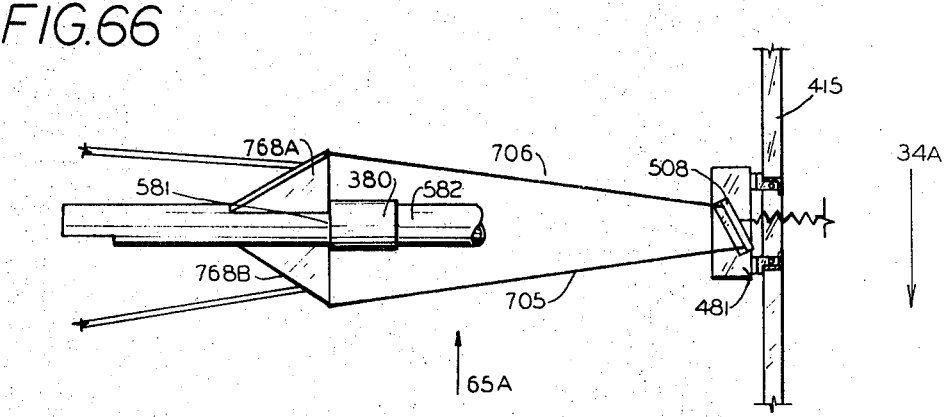
Figure 67:
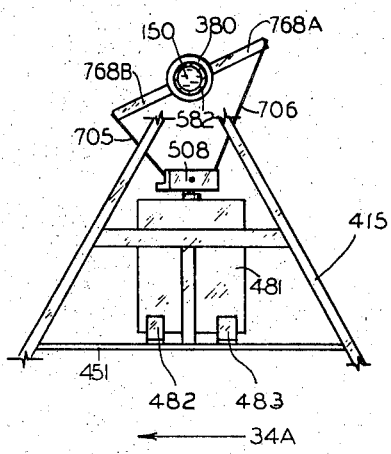

FIG. 65, 66, and 67 are, respectively front, top and end views of the control assembly 642 of FIGS. 53–55 when the station shown 415 is traveling uphill relative to its radially neighboring station fixed to the same pipe string; the position of the cables in these figures provide for orientation of the control arm 508 on the control assembly 642 to apply power to the motor of the station shown (415).

FIG. 66 is a composite section along planes 66A and 66B of FIG. 65 in the position of parts shown in FIG. 65 and FIG. 67 is a composite transverse sectional view along the vertical planes 67A and 67B of FIG. 65 in the position of parts shown in FIG. 65.

FIG. 68 is an enlarged front view of zone 38A of FIG. 35 showing a modified control assembly 442 of a typical movable station, 415, of apparatus 411 as seen along the direction of arrow 68A of FIG. 69 with the stations 415 and 414 moving forward on flat horizontal ground and the central longitudinal axis of the pipe portions 391 and 392 co-axial.

FIGS. 68 and 69 are respectively, front and top views of a control assembly of one station 415 of apparatus 411 of FIGS. 34–36 diagrammatically; FIG. 68 being a front view, FIG. 69 being a top view along the composite section of planes 69A and 69B of FIG. 68 and FIG. 40 being a transverse sectional view along the composite section of vertical planes 40AA and 40BB of FIG. 68.

Figure 70:
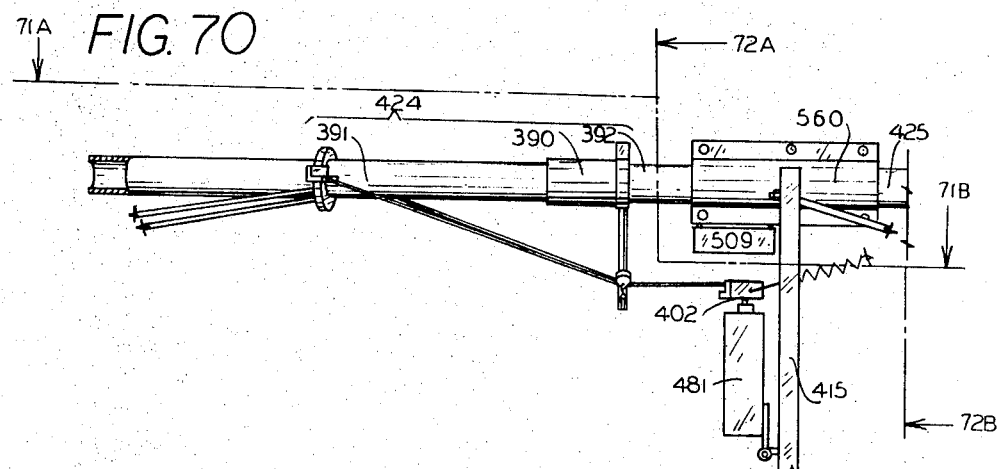
Figure 71:
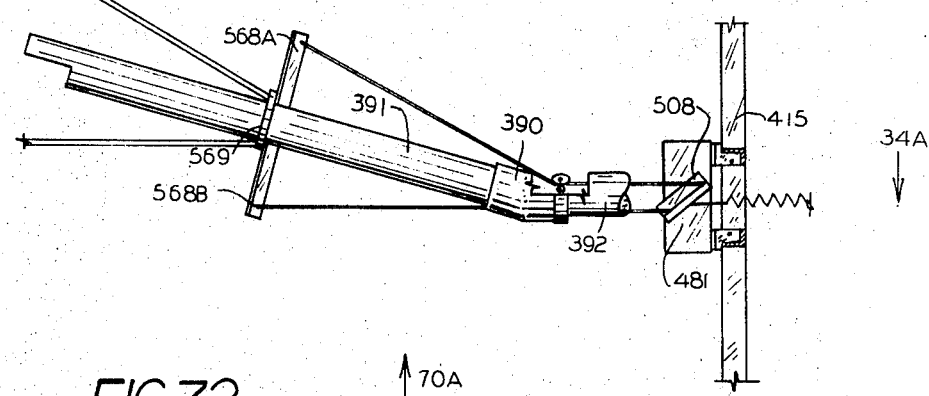
Figure 72:
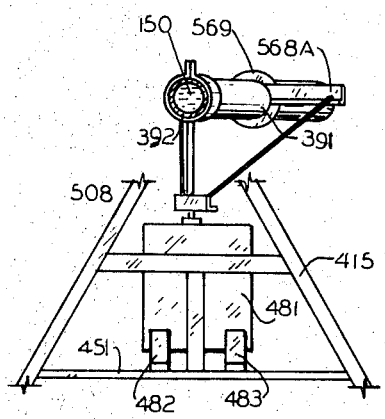

FIGS. 70, 71 and 72 are respectively, front, top and end views of the control assembly of FIGS. 68 and 69 with the station 415 of FIGS. 68 and 69 in advance of the station radial thereto, i.e. the station attached to pipe 424. FIG. 71 is a composite section along planes 69A and 69B of FIG. 68 (same as 71A–71B of FIG. 70) in the position of parts shown in FIG. 71. FIG. 72 is a composite sectional view along vertical planes 72A and 72B of FIG. 70 in position of parts shown in FIGS. 70 and 71. FIG. 70 is taken along direction of arrow 70A of FIG. 71.

FIGS. 73 and 74 are respectively, front and top views of the control assembly of FIGS. 68–72 where the station 415 is going uphill relative to its neighbor fixed to pipe 424 and the control cables here provide for the orientation of the arm 508 of the control assembly 442 to apply power to the motor of station 415. FIG. 73 is a front view along direction of arrow 73A. FIG. 74 is a composite section along planes 69A and 68B of FIG. 68 and planes 74A–74B of FIG. 74 and FIG. 52 is a composite transverse sectional view taken along planes as 52AA and 52BB of FIG. 73 and in position of parts shown in FIG. 73.

FIG. 75 is a diagrammatic wiring diagram and showing of structures in box 481 of FIGS. 34, 35, 36, and 38–74.

The term "radial" as used herein refers to the rightward direction along pipe series 419 in FIG. 34 away from the fixed central station 418; and the term "central" refers to the leftward direction along pipe series 419 in FIG. 34, towards the fixed central station 418. The term "forward" refers to the direction fo motion of apparatus 411 counterclockwise as seen from above and as shown in FIG. 35 and in direction of arrow 34A of FIG. 35 and "rearward" is the opposite direction.

DESCRIPTION OF THE PREFERRED EMBODIMENTS

The apparatus 411 generally comprises a combination of an electric power source as 288 and conduits, irrigation sprinkler supporting pipe string 419 and movable pipe supporting towers as 414 through 416 rigidly united with the continuous portions of pipe string and tower station motors as 484 on each station and, for each pair of adjacent stations, a motor control assembly 442 on the central station sensitive to the bending and twisting of the pipe string between the pair of stations.

More particularly, the apparatus 411 comprises a series of like units of guyed pipes and vehicle tower stations as 434, 435 and 433 a generally like end unit, a fixed station 418 and an electric power developing and transmission assembly as 279. Apparatus 411 operates on a water supply source 10. The number of units is as described in Table I herebelow.

Each unit as 435 comprises a vehicle tower station, as 415 and a portion, as 425, of a string of pipe, 419, firmly fixed thereto and located centrally (as below described) thereof. Pipe string 419, comprises a series of like portions and a pipe portion 421 which is located on the radial side of the most radial vehicle tower station 412; a pipe portion as 424 is located on the radial side of vehicle tower station 415 between tower stations 415 and 414; a pipe portion 425 is located radially of station 416 and located between stations 416 and 415; correspondingly like portions of pipes are located centrally of like vehicle stations and operatively attached thereto and supported thereon.

The units 433–435 are identical, however station 412 of unit 432 is rigidly attached at its radial side to a guyed portion 421 of pipe string 419, which portion 421 is continuous with remainder of string 419.

Irrigating nozzles are located on the like pipe portions as on 21 through 26 respectively on top of 419 to effect distribution to all portions of the field 28 of water passed into the central portion of the pipe string 419 and radially to 421 via a central vertical pivotal support pipe at central station 418 and operatively attached to a water source 10. Portions 420 to 426 are continuous. Nozzles or sprinkling heads as 38' (in FIG. 34) are located at suitably spaced distances on the top of string 419 on each of the pipe portions.

The string of pipe 419 comprises a series of lengths of pipe joined together at flanges as 179 to form a rigid conduit unit; these conduit units extend for a distance that is the same as the distance between towers and are operatively connected to each other by a pliant joint or coupling as 30. The clamps as 560 and 455 of each station as 415 firmly grasp a rigid portion of the conduit unit. The pliant joint portion is located outboard of each station as 415.

Each movable station as 415 comprises a rigid A-shaped frame assembly 440 and a wheel assembly as 241.

The wheel assembly 241 comprises a rear wheel assembly 270 pivotally attached to the rear end of member 450 and a front wheel assembly 290 is pivotally attached to the front end member 450 on plates affixed thereto.

The rear wheel assembly 270 comprises a rear wheel, a rear wheel fork, a rear wheel fork base, a rear wheel fork base bolt, a rear wheel shield, a rear wheel axle, a rear wheel sprocket and a rear wheel sprocket chain. The rear wheel is located on an axle which in turn is rotatably located at bottom of the fork thereof. The top of the fork has a base which is rotatably located on a plate member by vertical rear wheel bolt fixed to the base. A rear wheel shield is firmly located on the fork and serves to part the crops through which the movable tower station (as 415) moves. A rear wheel sprocket is co-axially located on the rear wheel axle with the rear wheel and is firmly fixed to that wheel. A rear wheel sprocket chain joins the rear wheel sprocket to drive it.

The front wheel assembly 290 comprises a front wheel, a front wheel fork, a front wheel fork base, a front wheel fork base bolt, a front wheel shield, a front wheel axle, a front wheel sprocket and a front wheel sprocket chain. The front wheel is located on an axle which in turn is rotatably located at bottom of the fork therefor. The top of the fork has a base which is rotatably located on a plate member by a vertical wheel bolt fixed to a base. A front wheel shield is firmly located on the fork and serves to part the crops through which the movable tower station moves. A front wheel sprocket is co-axially located on the axle with the front wheel and is firmly fixed to the front wheel. A front wheel sprocket chain joins the front wheel sprocket to drive it.

The motor 484 drives a double sprocket wheel. One set of teeth on the double sprocket wheel is operatively connected to the front wheel chain and another to the rear wheel chain for movement thereof as determined by the position of the parts in motor control 481.

The above description of the vehicle tower station 415 is applicable to all of the intermediate vehicular tower stations as 412–416 of apparatus 411 as they all (as shown for 415) have the same structure in general and in particular, except for the station next to the end, i.e. station 412, are all identical in structure. Station 412 does not have elements such as 442 as are shown and provided on station 415.

Each frame as 440 comprises a rigid central front member 446 as rigid lateral front member 447, a rigid central truss rear vertical member 448 and a rigid vertical radial rear vertical member 449. Members 446 and 447 extend forwardly and downwardly from pipe string 419; members 448 and 449 extend rearwardly and downwardly from string 419 as in FIGS. 34, 35 and 36. The vertical members 446–449 are connected at their bottom to a rigid horizontal wheel support member 450 and at their top to a pipe supporting clamp 560; the center portion of the members 447 and 449 are firmly fixed to and support a horizontal control box support member 451.

Frame 440 is, as shown in FIGS. 34, 35, and 36 a double frame of rigid steel L's, 446, 447, 448 and 449 and member 450 composed of a sturdy tube with member 450 being joined to members 446–449; there is a pivot plate firmly attached at the rear end of member 450 and a front and rear pivot with pivot bolts as passing through said plates so that in operation of 411 a non-skidding circular path will be traverse by the wheels of assemblies 270 and 290.

A rigid rear pipe support element 448 extends upwardly centrally and forwardly from the rear of frame element 450 as shown in FIGS. 34 and 35, 36 and 38; a corresponding front element 446 is attached to the element 450 and extends upwardly centrally and rearwardly. The elements 446 and 448 are joined at their central edge and they are there firmly joined to a band 455; the band 455 firmly holds the adjacent portion of pipe string 419; a clamp 560 is firmly located on the portion of pipe 419 between elements 447 and 449 and above control box support 451.

In each unit as 435 the portion, as 425, of the string of pipe 419 is provided with a guying assembly, as 429, for the pipe portions thereof as 425 for rigid connection thereof, so far as bending about a vertical axis is concerned, to the unit vehicle tower station, as 415, as well as providing a truss effect. Pipe guying assembly 429 comprises, for each section of pipe so trussed, such as 425 between stations 416 and 425 (as shown in FIGS. 34, 35, and 36), a plurality of like equal sized rigid braces 521, 522 and 523 and rods as 524 and 525. Each of braces 521, 522 and 523 is shaped like a triangle and extends forwardly and rearwardly of and below pipe portion 425 and is generally vertical parallel to plane of elements 447 and 449 and each is firmly attached to the pipe portion 425 by a clamp therefor, 521A, 522A and 523A respectively. The adjacent portion of the string of pipe 419 is firmly held to each frame as 440 by a first clamp 560 firmly attached to elements 447 and 449 and a second clamp 455 that is firmly attached to the rigid pipe position support elements 446 and 448. The closest distance between each station as 415 and nearest central brace, as 521, is the same as the distance between braces 521 and 522 and the same as the distance between braces 522 and 523 and between braces 523 and station 416, and the same as the distance between station 415 and brace 541 on pipe portion 424. A clamp 579 is located firmly attached to pipe portion 425 halfway between clamp 523A and station 416, the station central of station 415. Each of a pair of strong front and rear longitudinal rods as 525 and 524 respectively runs horizontally along and is attached to front and rear ends of clamp 560 and members 521, 522 and 523 respectively and clamp 579 and clamp 560; the rods 524 and 525 thus maintain the elements 451, 521, 522 and 523 parallel. Similarly, in unit 434 the pipe portion 424 between stations 415 and 414, has a transverse brace 541 corresponding to brace 523 on pipe portion 425 of unit 435, and a front longitudinal rod 542 (corresponding to rod 525 for unit 435) and a rod 544 corresponding to the rod 525 in the portion of assembly 429 of unit 435 between towers 415 and 416.

This particular guying assembly 429 is firmly resistant to rotation of each portion of pipe as 424 between the stations, as 414 and 415 (and between stations as 415 and 416, etc.) about the longitudinal axis of the pipe string 419 and accordingly substantially improves the sensitivity of the motor control 481 of each of the pair of neighboring stations as 414 and 415 to the relative angular position of one, central station, as 415 to the position of the other adjacent radially located station as 414 about the longitudinal axis of the pipe string 419.

The guyed pipe structure 429 is very resistant to twist about the central longitudinal axis of the pipe string 419 and, in combination with an outboard pivot joint 380 and a smoothly operating motor control 442 below the pipe string, provides corrective action for twist of adjacent pipe supporting stations relative to each other and the algebraic summation of such twist and bend is accomplished without interference with the water distribution pattern from the sprinklers on top of the pipe string. The guying of the pipe 419 between towers particularly concentrates the sum of any bending and twisting of as well as any bending or twisting of the pipe as 424 between the stations as 414 and 415 to the small portion of pipe as in zone 540 and provides an improved combination of means for detecting differences in angular orientation and transverse displacement of the pipe supporting stations as 414 and 415 relative to the intended longitudinal axis of the pipe string in the system 411 and applying the effect of such detection to motor means as 481 for rapid corrective action as needed.

A clamp as 569 is firmly located on each pipe portion as 424 four feet from the vehicle station as 415 of the near central unit as 435 and the most radial brace as 541 of the unit 434. A rigid control arm with wings 468A and 468B is firmly fixed to the side of that clamp 569. The rods as 442 and 444 extend from a clamp as 560 on station 514 to the clamp 569. The clamp 569 is located about one-fifth the distance between the centrally adjacent tower 415 and the brace 541 of the adjacent radially located guying assembly for the portion as 424 of the string 419 which is rigidly located relative to station 414.

The assembly 479 comprises a prime mover internal combustion engine motor 280, generator 288, a main electric input line 362 and main return line 363, and, on each station electric control switch as 481 and station electric vehicle station motors as 484 and a station control assembly 442 all operatively connected.

The generator 288 is directly connected to a main electric input line 362 which is firmly mechanically attached to line 419 as by clamps. An electrical cable line extends from outlet of generator 288 to a rotatable distributor on the station 418 to line 362.

An insulated electric conductor conduit or line 362 extends from distributor 366 to the most radial station in the series (as 412 in FIG. 34). Another main insulated electric conductor conduit return line 363 is connected to the branch line 283 of each station and extends along the string of pipe 419 from the most radial station of the system 411 (as 412 in FIG. 34) to a rotatable distributor 367 on station 418, line 363A extends therefrom to generator 288. Clamps on each of the pipe portions as 421–427 hold lines 363 and 362 to pipe string 419. Motor 280 is controlled by throttle 298 which throttle is controlled by voltage regulator 299 connected to lines 362 and 363 to keep a predetermined voltage therein.

On each station as 415 a reversible and staged or stepped electric control switch assembly 481 and variable speed electric vehicle station motors as 484, and a station control assembly 442 are operatively connected.

The control assembly for each intermediate tower station (between the end stations 412 and central pivot station 418) of embodiment 411, and referring to station 415 as exemplary, comprises, on the movable tower station as 415 a control box 481 with a two speed reversible electric motor as 484 and lines as 282, 283, 682, 683, 684, 285, 286, 285A, 285B, 286A and 286B, and outboard of each such station as 415, a displacement sensing unit 442 comprising wings 568A and 568B, joint 380 and a pulley support rod 500 firmly attached at its center to and supported on bracket 502 and pulleys 503 and 504 pivotally and rotatably supported at ends of and control cables 505 and 506.

Branch input lines as 282 and 283 are operatively connected to terminals of control box 481 and provide for transmission thereinto of electric power from lines as 362 and 363 and branch lines 682, 683 and 684 from main lines 682A, 683A and 684A are connected to other terminals of box 481 to control the direction of rotation of the motor 484, in standard manner. The starter 409 for the motor as 484 is operatively connected by one set of insulated electric conduits or lines as 285, 285A, 285B, for motion in one direction of motor 484, from one set of terminals of box 481 and a second set of insulated electric conduits or lines as 286, 286A, 286B, connects from the motor to another set of terminals of box 481 for motion in the opposite direction.

The control box 481 comprises a vertical guide bar 402, a rotatable switch actuating plate 404, a switch-starter selector unit 403, control arm 508 and shell 405. The shell 405 is firmly yet rotatably mounted on the member 451 and is held resiliently by spring 651 attached to the bar 508 and to the clamp 455.

The bar 402 is a rigid vertical steel bar rotatably supported on bearings therefor in a shell 405. Shell 405 is rigid water-tight box with a front door that may be opened and firmly closed and is supported on member 451 on hinges 482 and 483. The bar 402 extends upward through a watertight seal 406 and is firmly attached at its upper end to the center of the rigid horizontally extending control arm 508 and rotates with the rotation of that arm. Plate 404 is a rigid electrically insulating horizontal plate firmly fixed to the bar 402 within the shell 405. Adjustably movable arms 407, 407', 407" and 407''' are adjustably yet fixedly located on the plate 404 and effectively contact snap switches such as 408, 408', 408" and 408''' which are supported as below described on the shell 405 in a staggered array so that the movement of the arm 508 will serve to activate, in sequence on rotation of the arm 508 to provide a stepped speed control for the motor 484 dependent on the position of the arm 508 as well as to disconnect the motor 484 in other locations of the arm 508. In particular 407 actuates snap switch 408 when the arm 508 (as shown in FIG. 75) is slightly rotated clockwise as seen from above. This actuation of the snap switch 408 (which is a conventional spring loaded snap switch) connects, in low speed, motor 484 in the forward direction when the main directional switch 490, which is located near the main station as 418, connects the main directional control electric conduit line 489 to one directional control conduit line 492. When the directional motor switch 490 connects the line 489 to another line 493, the control box 481 is arranged for actuation of the motor 484 to move the station thereof (415) in the direction opposite to that of the arrow 34A still, as herein described for motion in direction of the arrow 34A, provviding power to or additional speed to stations in retard of their intended position or when going uphill and, further stop power or reducing the speed of stations in advance of others in the system as 411 or cutting out power to or reducing the speed of stations going downhill relative to the radially neighboring stations as described in relation to the explanation of FIGS. 38–52 herein and in Table II.

When arm 508 is in the position shown in FIGS 38 and 53 for forward (arrow 34A) motion of the apparatus 411 switch 408 will be closed and 408' open and the motor 484 at slow speed, for movement in the opposite direction at slow speed with same orientation of arm 508 switch 408'' is closed, and 408''' is open.

When greater displacement of arm 508 occurs as in FIGS. 60 and 57 the arm 508 moves clockwise as seen from above and contacts and moves and actuates the snap switch 408' and develops a higher speed at the motor 484. When the arm 508 thereafter rotates counterclockwise as seen from above the arm 407' contacts and causes the switch 408' to snap over to open position and this brings the motor 484 through its standard starting relay 409 into operation at a slow speed. When correction of the motion of the arm 508 has occurred (as in FIGS. 46, 48, 63 and 61) the arm 508 rotates counterclockwise as seen from above and the arm 407 strikes the snap switch 408 and disconnects the low as well as high speed this leaves the motor 484 disconnected. When further acceleration of the station 415 appears in order as herein described and provided for by the control system as 442 therefor the clockwise (as seen from above) rotation of the plate 404 again begins and the motor 484 moves from a stopped status to a slow speed status and if needed to a high speed status as above described.

When the directional control switch arm 491 of the switch 490 is moved to connect the line 683, then on counterclockwise rotation of the plate 404 and the arm 407' the snap switch 408' (which is similar in structure to the switch 408 above described) is actuated and, thereafter as greater speeds in that direction are required by the control system 442 and the plate 404 is rotated by action of the arm 508, the snap switch 408''' is called into circuit and brings in the high speed action of the motor 484 in direction opposite to that provided for by the array of electrical parts providing for movement in the direction of arrow 34A as hereinabove described.

The motor 484 is located firmly on member 450 of frame 440 on station 415; it drives a double sprocket wheel connected to wheels of assemblies 270 and 290. One set of teeth on the double sprocket wheel 87' is operatively connected to a front wheel chain and another to a rear wheel chain for driven movement thereof as determined by the position of the parts in control box 481.

The central end of pipe portion 424 is shown in FIGS. 38 to 52 as 382. This portion of the pipe 424 is firmly connected to and is a radial continuation pipe of string portion 425 and is outboard of station 415. The radially adjacent portion of the pipe 424 is indicated as 381. Portions 381 and 382 are joined by a pliant coupling as 380 in a fluid-tight, as well as mechanically reliable manner to support portion 381.

The pliant joint or coupling 380 comprises a rigid hook as 183 which is firmly attached to and supported by a rigid neck 184 that is firmly attached to a shoulder 185 which is firmly attached to the portion 381 of the pipe string 419. A rigid pin 186 that extends horizontally and transversely to the length of string 419 is firmly attached to and supported on a shoulder 188 of the pipe portion 382. The hook 183 is rotatably supported on the pin 186 but the grip thereon is loose enough to allow free movement about a transverse axis and a vertical axis passing through pin 186 and, also, that hook 183 rotate about the longitudinal axis of string 419 freely at least to a limited degree, i.e. at least 10 degrees; such a structure is generally shown in U.S. Pats. 1,528,070 and 2,807,480.

A sleeve 189 which is flexible and watertight is firmly attached to the outer surface of outer end of pipe 382 and the outer surface of inner end of pipe portion 381 and is held in position by clamp 190 on portion 381 and by clamp 191 on portion 382.

The pliant rotatable and twistable joint or coupling as 380 is thus located outboard of the central station 415 between each of the two serially and operatively connected portions as 381 and 382 of the pipe string 419 between each of the stations as 414 and 415. Substantially all the rotation about the longitudinal axis of the pipe string 419 between each of the stations in the apparatus 411 as stations 414 and 415 up to about 10 degrees, i.e. all the effective twist of the pipe string 419 between the stations such as 414 and 415 occurs across such couplings as 580 at portions as 381 and 382.

In the series of pipe as 424 and 425 shown in FIGS. 34–35, 36 and 38–53 each pipe as 425 is supported at a wheeled station 415, each such station is supported on wheel units as 270 and 290 and powered by an electric motor 484 and such motor is controlled by a switching assembly 481. Each rigid portion of guyed pipe in the series as 425 is firmly fixed to one station as 415 by a clamp as 560. The outboard portion 381 of pipe 424 is supported on a pliant joint 380 which is supported by the pipe portion 382 at a point outboard of or distinctly removed from the station 415 for rotational or twisting motion about the string 419 and a vertical axis spaced away from the station 415 depending on the relative position of the stations as 414 and 415 to which 424 and 425 are attached. The pipes 424 and 425 are coaxial when arrayed as shown in FIG. 38.

A yoke 568 is formed of rigid wings 568A and 568B which are rigidly fixed to each side of the pipe 424 by clamp 569. That yoke provides for the control of the motion of the motor 484 at station 415.

A clamp 501, firmly fixed to pipe 424 outboard of, or otherwise phrased to be clearly spaced away from the station 415, is firmly attached to and supports downward vertically extending rigid bracket 502; pulley wheels as 503 and 504 are supported on each end of bracket 502. Cables 505 and 506 are, respectively, fixed to the outer end of each of the yoke arms 568B and 568A. One end of each of cables 505 and 506 is attached to a T-shaped control arm 508 on the switch assembly 481. Each of these cables is trained or wound around and contacts a wheel as 503 between the attachment of that cable at one end to a yoke arm 368A and at its other end to the control element arm 508. Wheels 503 and 504 are pivotally and rotatably mounted on bracket 502.

In the operation of embodiment 411 the relative rotation of pipes 424 and 425 about the longitudinal axis of the pipe string 419 due to uphill motion of the station as 415 or bend of joint 180 about the vertical axis therethrough when the station as 415 is in retard of the station 414 in the assembly 411 rotates the element 508 of the switching assembly which thereby actuates the motor 484 of the wheeled station 415. Thereby the motor on the irrigating station 415 attached to the pipe string 419 will be actuated when the wheeled irrigation station 415 travels on land which is sloped uphill relative to the radial station as 414 to which the pipe 424 is attached or when the station 415 is in retard of the station 414 on the radial side thereof in a system of plurality of such stations as shown in FIGS. 33 and 34. Conversely, the motor 484 of the wheeled station 415 will be deactivated by motion of yokes 568A and 568B as shown in FIG. 48 when that station 415 is in advance of its radial neighbor 414 and/or as shown in FIG. 51 when that station 415 is going downhill relative to radially neighboring station 414 to which pipe 424 is attached. Also, the structure provides that there is a summation of the above discussed effects of retard and going uphill and the reverse.

In the position of apparatus shown in FIGS. 38–40 there is no tilt of the station 415 as is shown by the horizontal bar 451 on the generally A-shaped frame 440 of the station, and there is no bending of the string of pipe as shown in FIGS. 38 and 39 by the straight line running through the one portion of the pipe string 425 that is fixed to the wheeled station 415 and the second portion, 424 of the string of pipe which is attached to the pivot point therefor (380) which pivot point is outboard of and distant from the wheeled station 425. In this position the motor for that station is on.

Regarding the arms 568A and 568B as horizontal and FIGS. 44–46 as showing the transversely extending yoke or sensing arm on the pipe portion 381 in a horizontal position and, as shown by the relatively sloped position of the bar of the generally A-shaped frame of the wheeled station 415, the wheeled station is tilted downward toward the right. The control arm end 508B on the switch box 481 is rotated counterclockwise of its control position shown in FIGS. 38–40 opposite to that as shown in FIG. 51. For movement to the left of the station and system as shown in FIGS. 46 and 43 the switch of the motor control 481 would be in the "off" position (for movement of the system to the right as shown in FIGS. 46 and 43, the switch would be at the "on" position).

FIGS. 68, 70 and 73 show the control mechanism 481A apparatus with a hood 509 over motor control assembly 481; that hood is of value to protect the switch from water not shown in FIGS. 38–52 as the clarity of the matters herein discussed may be slightly more clearly shown where the hood is absent than where the hood is present.

FIG. 51 is an enlarged view of the control arm at the switch box in the uphill travel position of station 415 when station 414 is on horizontal ground (as well as when 414 travels downhill and 415 is travelling on level ground). In that position the transversely extending yoke or sensing arm 568 on pipe portion 424 is horizontal. For movement to the left of the station and system 411 the switch of the motor control of station 415 would be then in the "on" position. (For movement of the system to the right as shown in the FIGS. 50–52, the switch would be at the "off" position.)

Figure 41:
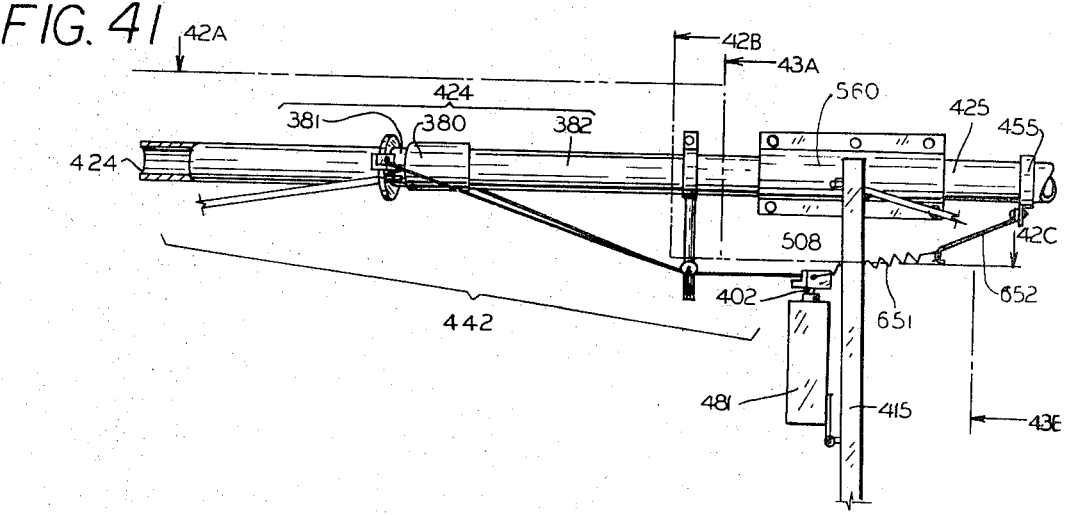
FIGS. 41, 42 and 43 are respectively, front, top and end views of control assembly of FIGS. 38–40 when the station 415 of FIGS. 38–40 is in advance of the station to which the pipe 424 is attached.
Figure 42:
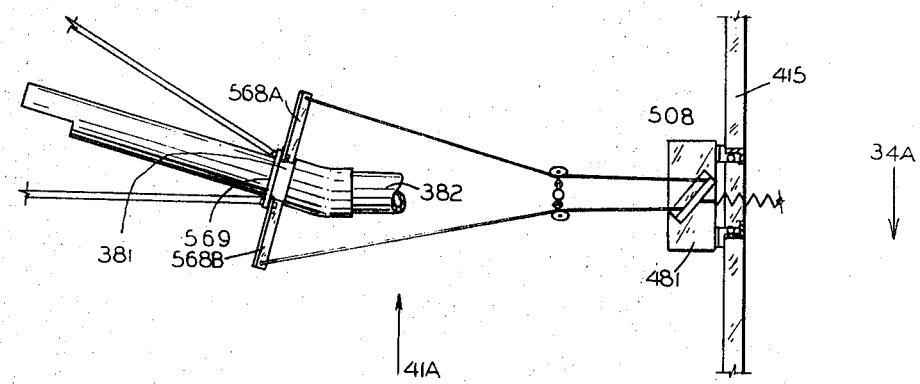
Figure 43:
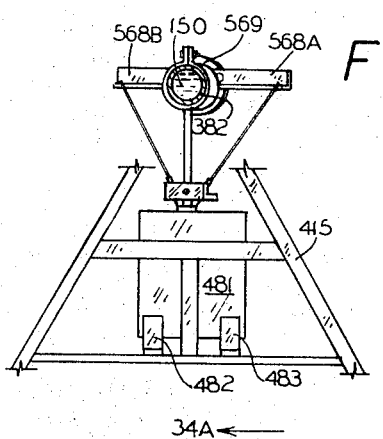

FIGS. 41 and 42 shows the transversely extending yoke or sensing arm 568 in a horizontal position and the wheeled support station 415 as shown by the horizontal position of the bar portion 452 of the generally A-shaped frame 440 of the wheeled station 415, also in horizontal position; the line of the string of pipes in the position here shown is, at the pivot point therefor, which is outboard of the wheeled station, bent to a position corresponding to that when the station shown is, for movement of assembly to the left as shown in FIG. 43, in advance i.e. in front of its proper position relative to its radial neighbor. This rotational movement about the vertical axis of the left-hand portion 568B of the yoke away from station 415 pulls the cable 505 on the left-hand side of the T; the movement of the other end of arm 568A of the yoke about the axis of hinge 580 towards station 415 loosens the cable 506 and permits the end 508B of the T 508 to move clockwise.

The end 508A of the switch box control arm is thereby rotated clockwise. For movement to the left of the assembly 411 shown in FIG. 43 the switch assembly 481 then turns the station motor (484) "off." This is the same switch position shown for FIGS. 44–46. This is the reverse of relations shown in FIGS. 47–52.

A feature of this invention is that there is no bending of the pipe at each support as 415 and 416. Bending at any one support would require that there be bending of the pipe at both sides of the support and would require discrimination by sensing means at the support of the reason for such bending in order to make proper correction therefor. By avoiding any bending of the pipe at an intermediate station support as 415 difficulties in a sensing and control system are avoided. By this apparatus arrangement there is no bending of the pipe at any intermediate support, all the bending is at a point or zone as 540 between supports, and assembly 442 for each vehicle motor station as 415 is the slave to only one master, the unit as 433 that is radial thereof, and is substantially insensitive to any bending that might occur at a unit, as 435 central thereof.

During travel of the apparatus 411 over a flat horizontal field perpendicular to the length of the pipe string 419 in its forward motion (shown as direction 34A in FIG. 35) the plane of movement of the longitudinal axis of the pipe string 419 is parallel to the plane of movement of the bottom of wheels of each of its stations, as 416 through 414. Each portion, as 424 of the string 419, is firmly attached to the frame of a station as 415 at clamps corresponding to clamps 560 and 455 at station 415. FIGS. 38, 39 and 40 diagrammatically represent the positions of pipe string portions 424 and 425, wing 568 and rod 502 and arm 508 when the longitudinal axes of adjacent pipe portions as 424 and 425 of string 419, each of which portions is firmly attached to each of a pair of one radial and one central station, as 414 and 415 respectively, lie in the same flat vertical plane and the bottom of the wheels of each such station, as 414 and 415, are on the same flat horizontal plane, the plane of the field as 28.

As shown diagrammatically in FIGS. 44–46 and 50–52 the position of the wings 568A and 568B of yoke 568 outboard of the station 415 and position of arm 508 is a reflection of the degree of twist of station 414 and portion 424 of string 419 relative to station 415, or, otherwise phrased, to the downward or upward direction of travel of the central station, as 415, relative to the plane of movement of the pipe string portion as 424, radial thereto during travel of the apparatus 411 perpendicular to its length.

As shown in FIGS. 41–43 and 47–49 the yoke 568 and control arm 508 and action of control box 481 are also sensitive to turning of the portion 424 of the pipe string 419 which portion 424 is firmly attached to the station 414 relative to the portion 425 of string 419 which portion 425 is firmly attached to station 415.

Regarding the portion of the field 28 on which the wheels of station 415 rest as level and the plane of section 39A and 39C as parallel thereto, as shown in FIGS. 50, 51 and 52, the displacement of wings 568A and 568B of yoke 568 about the longitudinal axis of pipe string 419 on downwardly tilted forward motion of the station 414 relative to horizontally moving station 415 produces a counter-clockwise (as seen in FIG. 52) displacement of the wing 568B relative to the bracket 502 (relative to the position thereof in a condition of apparatus 411 shown in FIGS. 38–40) and causes the same effect on arm 508 as does the bend in the pipe portion 424 at zone 540 shown in FIGS. 47–49 when the station 414 is advanced ahead of its intended position relative to the station central thereto, as 415, and accelerates the action of the motor for that station, as 415, and moves station 415 forwardly more rapidly until the rotary displacement of yoke 568 is removed. Regarding the plane of sections 39A and 39B as parallel to the portion of the field 28 on which the wheels of the station 415 rest and that portion as tilted and the portion of the field on which the wheels of the station 414 rest as horizontal, as shown in FIGS. 50–52 rotary displacement of wings 568A and 568B of yoke 568 about the longitudinal axis of pipe string 419 on upwardly tilted forward motion of the station 415, i.e. relative to horizontally moving station 414, produces a counter-clockwise (as seen in FIG. 52) displacement of the arms 568A and 568B of yoke 568 relative to the bracket 502 (relative to the position thereof in a condition of apparatus 411 as shown in FIGS. 38–40) and causes the same effect on arm 508 as does the bend in the pipe portion 424 at zone 540 shown in FIGS. 47–49 when the station 414 is to the rear of its intended position relative to the station central thereto, as 415, and accelerates the action of the motor for that station 415 until that rotary displacement of yoke 568 is removed.

Regarding the portion of the field 28 on which the wheels of station 415 rest as level and the plane of sections 39A and 39B as parallel thereto, as shown in FIGS. 44–46 the rotary displacement of wings 568A and 568B of yoke 568 about the longitudinal axis of pipe string 419 on upwardly tilting forward motion of the station 414 relative to a horizontally travelling station 415 produces a rotary (clockwise as seen in FIG. 46) displacement of the arms 568A and 568B of yoke 568 relative to the bracket 502 (relative to the position thereof in a condition of apparatus 411 shown in FIGS. 38–40) and causes the same effect on arm 508 as does the bend in the pipe portion 424 at zone 540 shown in FIGS. 41–43 when the station 414 is in advance of its intended position relative to the station central thereto, as 415, and slows the action of the motor for that station, 415, and slows the forward speed of station 415 until the displacement of yoke 568 is removed.

Regarding plane of sections 39A and 39B as parallel to the portion of the field 28 on which the wheels of the station 415 rest and that portion as tilted and the portion of the field 28 on which the wheels of the station 414 rest as horizontal, as shown in FIGS. 44–46 the rotary displacement of arms 586A and 568B of yoke 568 on downwardly tilted forward motion of the station 415 relative to the horizontally moving station 414 causes the same effect on arm 508 as does the bend in the pipe portion 424 at zone 540 shown in FIGS. 41–43 when the station 414 is lagging behind its intended position relative to the station central thereto, as 415, and slows the motor for that station 415 and slows the forward speed of station 415 until the rotary displacement of yoke 568 is removed.

As illustrated above in FIGS. 38 through 53, the energy transmitted to each station motor and speed of each station is responsive to the bending or twisting of the portion 424 of the pipe string radial, as at portion 540, to such station, as 415 while the location of the major portion of the pipe, as 425, central of that station and between that station (415) and the station central thereto (416) is fixed firmly to such station 415 as by clamps as 455 and 560 and a pipe guying assembly 429.

Rotation of one, as 414, of a pair of station as 414 and 415 in apparatus 411 about the longitudinal axis of the pipe string 419 results in that substantially all of the twist of pipe string portion 424, which includes portion 381 is fixed to the radial station as 414, is reflected to and measurable by and indicated by rotative motion of the yoke 568 about the longitudinal axis of the pipe string 419 (as that yoke 568 is fixed to the portion 381 of the string 419) while portion 382 is fixed to the portion 425 of the pipe string 419 as is the station central thereof. The location of the yoke 568 is of sufficient size and is at a sufficient distance from the vertical axis passing through the pliant coupling 380 and about which the pipe string 419 portion 424 rotates when station 414 is the advance of station 415 (or in retard thereof) to provide a significant displacement of the control means 508 to effectively control the motion of station 415. Thus where one station as 414 of embodiment 411 is located on ground sloped at an angle of 5 degrees to the ground on which neighboring station 415 stands so that there is a 5.00 degree twist of the pipe string 419 between the station 414 and the neighboring station as 415, then, across the pipe 419 from station 415 to yoke 568 there will be a twist, i.e. a rotation about the longitudinal axis of the cylindrical pipe string 419 of 5 degrees of the pipe 424 between the point of its attachment to the clamp 569 and its point of attachment to the clamp 560 (clamp 569 being attached to the yoke 568 and the clamp 560 attached to the station 415). Such twist of the pipe 424 produces clockwise or counterclockwise change of position of the arm 508, in direction as above discussed for FIGS. 41–53 and in an amount that provides a significant effect on the switch 481. When the control unit 442 is provided with dimensions as in Table I herebelow, when the control unit 442 is arrayed as shown in FIGS. 38–40 a rotation of 2 degrees of yoke 568 about longitudinal axis of pipe string 419 corresponds to a 4 degree rotation of the (2½ inch long radius, total length of 5 in.) arm 508 about bar 402 and a ¾ degree angular displacement of station 414 and the pipe string portion 424 fixed to station 414 about the longitudinal axis of the pipe string portion 424 as a radius horizontally transverse to longitudinal axis of pipe portion 424 relative to station 415 also corresponds to a 4 degree rotation of the (2½ in. radius) arm 508 about bar 402. The switch unit 403 in control box 481 is sensitive to a 4 degree rotation of bar 402 to turn the motor for station 415 as 484 on and off as above described in relation to FIGS. 38–52.

At each station, as 415, a spring 651 is firmly attached at one, central, end thereof to the radial end of a wire rod 652; the other, central, end of the rod 652 is hingedly yet permanently connected to the clamp 455 where the clamp contacts the bottom of the pipe portion 425. The radial end of spring 651 is attached to the rear of arm 508 at its center and that spring is usually under a few pounds of tension. This tension keeps the cables as 505 and 506 of assembly 442 (and cables as 705 and 706 of assembly 642) which cables are substantially dimensionally stable, taut. Each spring 651 and rod 652 also help keep the box 481 upright on the hinges 482 and 483 which support each box as 481, on its frame as 415. This spring structure also avoids any slack and loss of sensitivity of assembly 442 (and 642) that might otherwise occur on the central station, as 415 being at a higher level than the station 414 central thereto (as 414) and avoids any binding and loss of sensitivity of the control 442 (and 642) on the station 415 being lower than station 414.

With movement of the clamp 501 and bracket 502 laterally, with the size and position of box 481 and arm 508 and arm as 568 constant the response to twist increases as the bracket 502 is moved radially, however, the response to the displacement transverse of the longitudinal axis of the pipe horizontally decreases as the bracket 502 approaches the arm 568 very closely.

TABLE I

Dimensions of embodiment 411 wherein the cables 505 and 506 are horizontal from the points of their attachment to arm 508 to their point of contact with wheels 503 and 504, and the cables 505 and 506 are joined to yoke 568 in a horizontal plane that passes through the center line of pipe portions 382 and 381 parallel to center line (or axes) of pipe 382:

(1) From vertical plane of center line (which is longitudinal axis) of pipe portions 382 and 381 horizontally—
   (a) To attachment of cable 505 to arm end 508B of arm 508—2½ in.
   (b) Horizontally to attachment of cable 505 to wing 568B of yoke 568—12 in.
(2) From horizontal plane including center line of pipe 382 vertically to plane of rotation of arm 508 at point of attachment thereto of cables 505 and 506, 505 and 506 being on same horizontal plane—1 ft. 3 in.
(3) Axially, along a vertical plane parallel to the center line of pipe portions 382 and 381—
   (a) From point of attachment of cable 505 (and 506) to arm 508 to vertical plane passing through center of bracket 502, which plane is perpendicuto center line of pipe portions 382 and 381 and which plane passes through axes of pulley wheels 503 and 504—1 ft. 2 in.

(b) From vertical plane passing through center of bracket 502, which plane is perpendicular to center line of pipe portions 382 and 381 and which plane passes through axes of pulley wheels 503 and 504 to vertical plane perpendicular to center line of pipe portions 381 and 382 and which plane passes through the points of attachment of cables 505 and 506 to wings (568B and 568A respectively) of yoke 568—2 ft. 7¾ in.

(An angle of 17½°±½° with horizontal plane and 18½°±½° in vertical plane.)

Each cable as 505 between its pulley as 503 and yoke 568 forms an angle with horizontal plane—17½°±½°

And forms an angle with vertical plane of 18½°±½°

(4) In embodiment 411 the height of stations as 415 from the bottom of wheels to center of string 419 is 13 ft.

Distance between stations as 414 and 415 along length of pipe string 419 is 90–125 ft.

Outside diameter of pipe of pipe string 419—6⅝ in.

Wall thickness of pipe of pipe string 419—10 gauge (0.1345 in.)

As the length of string 419 from station 418 to end of embodiment 411 (442 control) depends on number of towers there are usually 10 such towers and the pipe extends past the most radial station; the usual length is 1280 ft.

In regard to the sensitivity of units as 414–416 of apparatus 411 with unit 442 dimensioned as in Table I to turn in a horizontal plane of portions as 381 and 382 about a vertical axis passing through joint as 380, as on advance of station 414 relative to station 415, as diagrammed in FIGS. 41–43, and 47–49, a 12½ inch forward or rearward movement of the station 414 at one end of a 90 foot portion of pipe string 419 relative to 415 will produce a 0.15 inch horizontal movement in the position of the end of tongue 568 to which cables 505 and 506 are attached and such displacement has a 4 degree turning effect, as above described, on control 481 which has, as above described, only a 2½ inch control arm 508. Moving bracket supporting rod 502 laterally to form a greater angle between the longitudinal axis of pipe string 419 to the straight lines from pulleys 505 and 506 to the connection to the arm 568 of cables 505 and 506 also increases twist and turn sensitivity when pipe portion 382 and rod 502 have fixed length; increasing the length of arm 568 further increases twist sensitivity if desired with length of arm 508 fixed and the line of cables 505 and 506 from their points of contact with their respective pulleys to their respective connection to arm 508 being parallel to the longitudinal axis of pipe portion 382, as in the case for embodiment 411 and as shown in FIGS. 38–40.

The above description of the vehicle tower station 415 is applicable to all of the intermediate vehicular tower stations as shown for 414 through 416 of apparatus 411 as they all (as shown for 415) have the same structure in general and in particular except for the station next to the end, i.e. station 412, are all identical in structure.

Station 412 does not have control elements such as assembly 442 as are provided on station 415. Station 412 is provided with a preset speed depending on amount and rate of water dispersal desired and area treated therewith. The motor at station 412 is the same as at stations 414 through 416, i.e. all the other stations of embodiment 411; the gear wheels as 87, are also the same and control assemblies as 481 turns the motor of each station on and off to maintain the pipe string 419 in a straight line with only a 1 degree to 2 degree bend at zones as 540, while pipe string 419 and stations attached thereto as 414 through 416 move in a circular path about the centrally fixed station 418 as in Table II.

In view of that the rotation of the adjacent stations, as 414 and 415 on the apparatus 411 about a vertical axis through the pliant joints, as 380, is limited by the action of the control system to usually less than 2 degrees and that the rotation of the adjacent stations about a longitudinal axis of the pipe string is also limited to less than 2 degrees, to simplify the construction and lessen the expense thereof the control adjustment is as in embodiment 211 made more sensitive than in embodiment 11 to the relative rotation or twist of the adjacent stations by using a single husky universal joint or coupling as in U.S. Pat. 1,528,070 between each pair of adjacent stations as 414 and 415 so that all such twist occurs across such coupling and yoke 568 is located and dimensioned to be sensitive to the turning as well as the twisting while using a guyed pipe string structure that permits avoiding tall towers and wide pipe guying assemblies.

In operation of embodiment 411 a water supply source 10, as a well, is provided with a pump 177, and a conduit system 178 operatively connected thereto and to central vertical pipe portion at station 418. The vertical pipe portion is operatively connected to a water-tight swivel joint with a vertical axis of rotation; the pipe portion 421 of the string of pipe 419 is operatively attached to that joint and all portions as 424 and 425 of the string of pipe 419 are operatively connected in series as at flanges as 179 at each end of each length of pipe forming the series 419, except where pliant joints as 380 are used. Water is pumped through pipe string 419 at a uniform and continuous rate: all portions of the pipe string 419, supported on the moving vehicular stations as 414–417 move at an overall substantially uniform angular rate of movement in a circular path about station 418 and distribute water as 150 at a uniform weight per unit area on the field traversed by the apparatus 411.

The apparatus of FIGS. 53–67 is a control system, 642, similar to the control assembly 442 in embodiment 411. This assembly provides a particularly simply manufactured control system for an automatic movable irrigation system sensitive to the upward and downward travel of each of the stations of a wheeled automatically moving irrigation system as well as its relative advance or retarded position in the overall assembly so as to compensate therefor and thereby automatically maintain alignment over rolling terrain in place of system 442.

Assembly 642 is used together with the series of operably connected water conduit pipes as 424 and 425 wherein each pipe as 425 is supported on the wheeled and powered station as 415; and the motor, 484, of such station is controlled by switching assembly 481 supported on the frame of station 415. Each rigid portion of pipe in the series as 425 is operably joined to the next like and radially located portion of pipe as 424 at a flexible support or joint therefor 380 (same as 380 in FIGS. 38–53) as in U.S. Pat. 1,528,070 or 2,806,480 with coincident vertical axis of rotation and a horizontal axis of rotation and longitudinal axis of rotation and a water-tight sleeve as 189: each vertical axis is outboard of or removed from the station 415.

Each portion of pipe as 425 in the multi-station system is firmly fixed to one station as 415 by a clamp as 560. The outboard pipe as 424 is supported on a pivot or flexible member 380 supported by the pipe as 425 at a point outboard of or distinctly removed from the station 415 for rotational or twisting motion about the longitudinal axis of the pipe 424 and for, also, pivotal motion about a vertical axis which vertical axis is spaced away from the station 415, depending on the relative position of the stations to which 424 and 425 are attached. The pipes 425 and 424 are co-axial (about axis through their length) when arrayed as shown in FIGS. 53 through 56.

A yoke 768 is formed of rigid wings 768B and 768A each of which is rigidly fixed to each side of the pipe 424. Yoke 768 provides for the control of the motion of the motor at station 415. Cables 705 and 706 are, respectively, fixed to the outer end of each of the yoke arms 768A and 768B. One end of each of cables 705 and 706 is attached to the control arm 508 on the switching assembly 481.

Arm 508 of assembly 481 is thereby sensitive to twisting of pipe 424 about its longitudinal axis as well as bending of pipe 424 relative to pipe 425 about the vertical axis through joint 380 by motion of the arm 508 in response to the motion of yoke 768 in turn responsive to the relative rotative and axial position of pipes 425 and 424 and the stations as 415 and 414 attached thereto.

In the operation of the structure of FIGS. 53–55, the relative rotation of pipes 425 and 424 about the longitudinal axis due to uphill motion of the station as 415 when other stations in the assembly are on level ground or the relative rotation of pipes 425 and 424 about the vertical axis of joint 380 when the station as 415 is in retard of the other stations in the assembly, rotates the element 508 of the switching assembly 481 which thereby actuates the motor of the wheeled station 415. Thereby the motor 484 on the irrigating station 415 attached to the central pipe 425 will be actuated when the wheeled irrigation station 415 of assembly of stations is in its usual or "in line" position as shown in FIGS. 53 through 55 and when such station moves uphill relative to the radial station to which the pipe 424 is attached as in FIGS. 65, 66 and 67 or when the station 415 is in retard of the station on the radial side thereof in a system of plurality of such stations, as shown in FIGS. 62, 63 and 64. Conversely, the motor of the wheeled station 415 will, as shown in the figures, be deactivated by motion of yoke 768 as shown in FIGS. 56, 57 and 58 hereto when that station is in advance of its radial neighbor and/or, as shown in FIGS. 59, 60 and 61 when that station 415 is going downhill relative to the radially neighboring station to which pipe portion 424 is attached.

The control structure 442 provides that there is algebraic summation of effects of retard and going uphill and of the effects of advance and going downhill as well as a summation of separate effects of retard and going uphill above described for a central station as 415 relative to a radial station as 414 and a summation of the separate effect of advance and going downhill above described for a central station as 415 relative to a radial station as 414. This algebraic summation effect provides for subtraction of opposing effect as well as addition of like corrective action on the motor provides that while the power provided to a central station as 415 going uphill, relative to the station radial thereto as 414 is increased over the power provided thereto (to that central station) on straight travel parallel to the station (as 414) radical thereto, as the system 411 is also sensitive to displacement transverse to the longitudinal axis of the string 419, the control system 422 therefor will act to prevent that the central station of the pair, as 415 advance ahead of its intended alignment position to an amount of displacement transverse to the longitudinal axis of the pipe string 419 beyond that permitted by the sensing and action of the control system 442 to such displacement notwithstanding the correction on action of motor 484 made by the control system 442 on relative uphill travel of one central station as 415 to another neighboring central station as 414 in the system 411.

Also, according to the control system provided, correction of power provided to a motor control as 481 and motor as 484 of a station as 415 due to relative downhill travel is tempered by and correction made for any lag of that station as this algebraic summation effect provides that while the power provided to a central station as 415 going downhill, relative to the station radial thereto as 414 is decreased from the power provided thereto (to that central station) on straight travel parallel to the station (as 414) radial thereto, as the system 411 is also sensitive to displacement transverse to the longitudinal axis of the string 419, the control system 442 therefor will act to prevent that the central station of the pair, as 415, lag behind its intended alignment position to an amount of displacement transverse to the longitudinal axis of the pipe string 419 beyond that permitted by the sensing and action of the control system 442 to such displacement notwithstanding the correction on action of motor 484 made by the control system 442 on relative downhill travel of one central station as 415 to another neighboring central station as 414 in the system 411.

In the position of apparatus shown in FIGS. 53 through 55 there is no tilt of the station 415 as is shown by horizontal bar 451 on the generally A-shaped frame of the station, and there is no bending of the string of pipe as shown by the straight line running through the one portion of the pipe string, 425, that is fixed to the wheeled station 415 and a second portion, 424, of the string of pipe which is attached to the pivot joint 380 therefor, which pivot joint is outboard of and distant from the wheeled station 415 and motor 484 is on.

FIGS. 59–61 and 65–67 show a 15 degree tilt of yoke 768 to the generally horizontal plane of rotation of pipe string 419 about station 418: this is higher than usually obtainable in the field as the 15 degree slope is for purpose of diagrammatic illustration of the relations shown: sensitivity to 3° or less degree change in slope is usual. FIGS. 56–58 and 62–64 show, for purposes of illustration, a 15 degree angle between axis of pipe 424 and axis of pipe 425; sensitivity to 1½ or less degrees is usual by the apparatus 642.

It will be noted, and is critical to this arrangement that the plane of rotation of the top of the arm 508 on top of the switch box 481 on the station 415 to be substantially below the longitudinally extending axis of the pipes 424 and 425 when those pipes are in their rest or "in line" position as shown in FIGS. 53, 54 and 55. To a reasonable degree the greater the distance in height between (a) longitudinal axis of pipes as 424 and 425, and/or plane of outer ends of the arms of yoke 768 (the cables as 705 and 706 being attached to such outer ends) and (b) the plane of rotation of the control element 508 of the switching assembly 481 the greater the responsiveness of 508 to twist of 424 relative to 425 up to an angle of 45 degrees of cables 705 and 706 to the horizontal. If, however, the plane of rotation of the arm 508 were at the same level as the line going through the attachments of cables 705 and 706 to the yoke 768 there would be no response to twist although there would be a response to bending as shown in FIGS. 56–58 and 62–64. Similarly, if wheels were located at a level of its longitudinal axis and fixed to pipe 582 such arrangement would cancel out the effect of twist on the response provided by apparatus of FIGS. 53 through 55 herein of the arm 508 to the relative twisting of the pipes 424 and 425 about their longitudinal axes as shown in FIGS. 59–61 and 65–67 and such relationship is specifically avoided by this invention.

In the assembly 642 the member 581 corresponds to member 381 of assembly 442 and member 582 corresponds to member 382; while the pulleys 503 and 504 are absent in system 642 the action of cables 705 and 706 on arm 508 is qualitatively the same as above described for cables 505 and 506 on arm 508 of control box in system 442. The description of qualitative operation of the system 442 in the position shown in FIGS. 38–52 applies to the description of the operation of the system 642 shown in the FIGS. 53–67 that correspond to the relations shown in FIGS. 38–52 as set out in Table II.

An imperforate watertight hood 509 may be firmly supported above the cables and above the arms of assembly 481 as on bottom of clamp 560, to protect the exterior bearing and interior of assembly 481 from water.

TABLE II.—REACTION OF CONTROL SYSTEMS OF EMBODIMENT 411

| Relative position of controlled station (415) relative to station radial thereto | Control Systems | | Action of control 481 on movement in direction— | |
|---|---|---|---|---|
| | 442 | 642 | Arrow 34A | Opposite 34A |
| In line with 414 | 38, 39, 40 | 53, 54, 55 | Motor on | On. |
| In retard of 414 | 47, 48, 49 | 62, 63, 64 | On or increase | Off. |
| Uphill of 414 | 50, 51, 52 | 65, 66, 67 | ----do---- | Off. |
| Advanced of 414 | 41, 42, 43 | 56, 57, 58 | Off | On or increase. |
| Downhill of 414 | 44, 45, 46 | 59, 60, 61 | Off | Do. |

The dimensions of a control system 642 are set out in Table III.

TABLE III (1) From vertical plane of center line (which is longitudinal axis) of pipe portions 382 and 381 horizontally:
   (a) To attachment of cable 505 to arm end 508B of arm 58—2½ in.
   (b) Horizontally to attachment of cable 505 to wing 568B of yoke 568—12 in.

(2) From horizontal plane including center line of pipe 582 vertically to plane of rotation of arm 508 at point of attachment thereto of cables 705 and 706, 705 and 706 being on same horizontal plane—1 ft. 3 in.

(3) Axially, along a vertical plane parallel to the center line of pipe portions 582 and 581:
   (a) From point of attachment of cable 705 (and 706) to arm 508 to the points of attachment of cables 705 and 706 to wings (768B and 768 respectively) of yoke 768—2 ft. 7¾ in.

(4) Distance from station 415 to point of rotation of joint 380 is 24 in.

(5) Linear displacement of a typical radial station as 414 to length of pipe string 419 sensed and acted upon at motor control station, as 481, of neighboring central station, as 415, which control station is sensitive to a 4 degree rotation of its arm 508 is—16 in.

(6) Degree of rotation or twist about longitudinal axis of string 419 of a radial station as 414 sensed at neighboring central station as 414 the motor control 481 of which is sensitive to (i.e. changes its switching connections on) a 4 degree rotation of its control arm 508 is 2±¼ deg.

FIGS. 68 and 69 illustrate the improvement on sensitivity to turn obtained by elongating the portion 381 (shown as 391) between hinge 390 (corresponding to hinge 380) and yoke 568 in zone 540 of embodiment 411: as illustrated in FIGS. 71 and 72 such change increases the sensitivity to advance of the station 415 relative to 414 but, as shown in FIG. 74, slightly decreases the sensitivity of the system to twist. This illustrates not only the variations of structure that may be used to obtain the desired ratio of sensitivity to retard or advance transverse to longitudinal axis of string 419 and twist about such longitudinal axis, but also that, so long as the axial movement of the arm 508 is not interfered with and the axis of rotation of yoke 568 is vertically distinct from the plane of rotation of arm 508 and the cables extend vertically of yoke 568 pivot 390 may be closer to station 415 than shown in the other embodiments of FIGS. 53–67.

I claim:

1. A travelling sprinkler apparatus comprising in operative combination a pipe string assembly and a plurality of pipe supporting mobile stations and a control assembly for each of said plurality of pipe supporting stations;

said pipe string assembly comprising a plurality of pipe string assembly portions, each of said pipe string assembly portions in series with another and extending radially from a central pipe pivot support, each of said pipe string assembly portions comprising a guyed pipe portion, a flexible conduit portion and a rigid conduit portion operatively connected in series; and each of said pipe string assembly portions extending from one radial station to a station central thereto, and (a) said guyed portion comprises a liquid conduit with liquid spraying means operatively attached thereto and guying elements operatively connected thereto, and the radial end of said guyed portion is attached to said radial station and the central end of said guyed portion is operatively attached to the radial end of said flexible conduit portion, and said guyed pipe portion is supported by said guying assembly against rotation about the longitudinal axis of said pipe string, and (b) the flexible portion comprises a water-tight liquid conduit rotatable about a vertical axis and about a transverse horizontal and about the longitudinal axis of the pipe string, each said axis passing through said flexible portion, said flexible portion operatively connected at its central end to the radial end of said rigid portion, and (c) said rigid portion comprises a conduit operatively connected at its central end to a pipe string assembly portion supported by and attached to the central station, and which rigid conduit portion extends radially from said central station;

each of said pipe supporting mobile stations comprising in operative combination a rigid frame and a ground engaging means and a motor means, and a motor control means and energy transmission means operatively connected to said motor control means, said motor means and ground engaging means operatively attached to and supported on said frame; said motor attached to said ground engaging means in driving engagement therewith and said motor control means operatively attached to said motor and firmly supported on the frame of said central station;

said control assembly comprising (a) a rigid radial station position and orientation indicating vertically extending arm means, said arm means being firmly attached at one end to the guyed portion of said pipe string between one, radial, station and the flexible portion of the pipe string between said radial station and a station central thereto, and (b) said motor control means comprises a switch control arm and a switching mechanism, said switch control arm operatively connected to and controlling said switching mechanism and said switch control arm is located below said rigid portion of said pipe string;

(c) cable means attached to the other end of said rigid radial station position and orientation indicating arm means and extending therefrom and attached to said switch control arm means;

(d) said rigid radial station position and orientation indicating arm extending horizontally and transversely of the longitudinal axis of the portion of the pipe string to which attached, the switch control arm extending transversely of a vertical plane in which plane the longitudinal axis of the rigid pipe portion lies, the distance from the longitudinal axis of the pipe string to point of attachment of said cable to said rigid radial station position and orientation indicating arm being greater than the distance from the said vertical plane to the point of attachment of said cable to the switch control arm;

(e) said cable from its attachment to said rigid radial station position and orientation indicating arm toward the attachment of said cable to said switch control arm extends downwards relative to the longitudinal axis of the pipe string and centrally towards said switch control arm and in a direction transverse to the said vertical plane in which the longitudinal axis of the rigid pipe portion lies and towards said vertical plane whereby said switch control arm is actuated on angular movement of said radial station relative to said central station about the longitudinal axis of said pipe string portion and on movement of said radial station relative to said central station in a horizontal direction transverse to said longitudinal axis of said pipe string and one end of a resilient tension member is attached to said switch control arm means and another end of said resilient tension member is attached to a point fixed relative to said frame and maintains said cable means taut.

2. Apparatus as in claim 1 wherein said guying assembly comprises rigid members extending to points on both sides and vertically displaced from said guyed pipe portion and said spaced apart points are firmly joined to and by rigid longitudinal members.

3. Apparatus as in claim 1 comprising also a cable pulley support operatively and firmly attached to the rigid pipe portion central of the flexible portion and radial of said central station, a pulley rotatably mounted on said pulley support and the cable extending from said rigid station position and orientation indicating arm means to said switch control arm means is in contract with said pulley, and wherein said cable from its attached to said rigid radial station position and orientation indicating arm toward the point at which the cable is in contact with said pulley extends downwards relative to the longitudinal axis of the pipe string and centrally towards said switch control arm and in a direction transverse to the said vertical plane in which the longitudinal axis of the rigid pipe portion lies.

4. Apparatus as in claim 2 wherein a cable pulley support is operatively and firmly yet adjustably attached to the rigid pipe portion central of the flexible portion and radial of said central station, and a pair of pulleys are rotatably mounted on said pulley support and the cables, on extending from said rigid station position and orientation indicating arm means to said switch control arm means are in contact with said pulleys, and wherein each of said cables, from its attachment to said rigid radial station position and orientation indicating arm toward the point at which the cable is in contact with said pulley, extends downwards relative to the longitudinal axis of the pipe string and centrally towards said switch control arm and in a direction transverse to the said vertical plane in which the longitudinal axis of the rigid pipe portion lies.

5. Apparatus as in claim 4 wherein said motor is activated by a two degree rotation of said central station relative to said radial station about the longitudinal axis of said pipe string said switch mechanism is activated by a minimum of four degrees rotation in said switch control arm.

6. Apparatus as in claim 5 wherein said motor is reversible and has variable speed in each direction.

7. Apparatus as in claim 1 wherein each said cable and each said rigid station position and orientation indicating arm and each said switch control arm is one of a pair of such elements and each of said cables is substantially straight from its connection at one end of one of said rigid station positions indicating arms to its attachment to one of said switch control arms.

8. Apparatus as in claim 7 wherein said motor is activated by a 2¼ degree rotation of said central station relative to said radial station about the longitudinal axis of said pipe string said switch mechanism is activated by a minimum of four degrees rotation of said switch control arm.

References Cited
UNITED STATES PATENTS

| | | | |
|---|---|---|---|
| 1,068,797 | 7/1913 | Mathews | 239—177 |
| 1,419,925 | 6/1922 | Heine | 239—177 |
| 2,604,359 | 7/1952 | Zybach | 239—177 |
| 2,893,643 | 7/1959 | Gordon | 239—177 |
| 2,941,727 | 6/1960 | Zybach | 239—177 |
| 3,001,721 | 9/1961 | Zybach | 239—177 |
| 3,353,750 | 11/1967 | Dowd | 239—177 |
| 3,353,751 | 11/1967 | Dowd | 239—177 |
| 3,394,729 | 7/1968 | Bower et al. | 239—212 |

LLOYD L. KING, Primary Examiner

U.S. Cl. X.R.

239—212